US012742538B2

(12) United States Patent
Beck et al.

(10) Patent No.: US 12,742,538 B2
(45) Date of Patent: Sep. 22, 2026

(54) ADJUSTABLE HIDDEN PANEL FOR DOWNLIGHT ATTACHMENT IN METAL CEILING

(71) Applicant: Lucifer Lighting Company, San Antonio, TX (US)

(72) Inventors: Brian Beck, Spring Branch, TX (US); Mark Knowles, Lockhart, TX (US); Adam Olson, San Antonio, TX (US)

(73) Assignee: Lucifer Lighting Company, San Antonio, TX (US)

( * ) Notice: Subject to any disclaimer, the term of this patent is extended or adjusted under 35 U.S.C. 154(b) by 0 days.

(21) Appl. No.: 19/347,893

(22) Filed: Oct. 2, 2025

(65) Prior Publication Data

US 2026/0029115 A1 Jan. 29, 2026

Related U.S. Application Data

(63) Continuation-in-part of application No. 19/027,937, filed on Jan. 17, 2025, now Pat. No. 12,492,806, which is a continuation-in-part of application No. 18/738,136, filed on Jun. 10, 2024, now Pat. No. 12,228,264.

(Continued)

(51) Int. Cl.

| | |
|---|---|
| ***F21V 21/04*** | (2006.01) |
| ***F21S 8/02*** | (2006.01) |
| ***F21V 21/30*** | (2006.01) |
| ***F21V 23/04*** | (2006.01) |
| ***F21V 29/70*** | (2015.01) |

(Continued)

(52) U.S. Cl.

CPC ............ *F21V 21/043* (2013.01); *F21S 8/026* (2013.01); *F21V 21/30* (2013.01); *F21V 23/045* (2013.01); *F21V 23/0471* (2013.01); *F21V 29/70* (2015.01); *F21V 33/0076* (2013.01); *F21Y 2115/10* (2016.08)

(58) Field of Classification Search

CPC ...... F21S 8/026; F21V 21/043; F21V 23/001; F21V 23/008

See application file for complete search history.

(56) References Cited

U.S. PATENT DOCUMENTS

| | | | |
|---|---|---|---|
| 12,492,806 | B2 | 12/2025 | Beck et al. |
| 2008/0002414 | A1 | 1/2008 | Miletich et al. |

(Continued)

*Primary Examiner* — Christopher E Dunay

(74) *Attorney, Agent, or Firm* — Harness, Dickey & Pierce, P.L.C.

(57) ABSTRACT

A light fixture assembly for assembly into a ceiling component channel includes an elongated tray with a base with a first side, a second side and a first opening. The base has first and second longitudinally extending walls extending from the second side. The first longitudinally extending wall has a first coupler. The second longitudinally extending wall has a second coupler extending inwardly toward the first longitudinally extending wall. A first adjustable bracket includes a first portion coupled to the first coupler and a second portion coupled to the second coupler. The first portion and the second portion couple the elongated tray to the ceiling component channel. The light fixture assembly further includes a light assembly. A coupling assembly couples the light assembly to the elongated tray. The coupling assembly is positioned around the first opening and adjacent to the second side of the base.

20 Claims, 23 Drawing Sheets

Related U.S. Application Data

(60) Provisional application No. 63/521,331, filed on Jun. 15, 2023.

(51) Int. Cl.
*F21V 33/00* (2006.01)
*F21Y 115/10* (2016.01)

(56) References Cited

U.S. PATENT DOCUMENTS

| | | | | |
|---|---|---|---|---|
| 2012/0044703 | A1* | 2/2012 | Wilson | F21V 21/04<br>362/365 |
| 2022/0010950 | A1* | 1/2022 | Miller | F21V 23/023 |
| 2022/0018523 | A1* | 1/2022 | Vinh | F21V 21/04 |
| 2022/0357003 | A1* | 11/2022 | Mathews | F21S 8/026 |
| 2023/0045452 | A1* | 2/2023 | Portinga | F21V 29/76 |
| 2024/0418331 | A1 | 12/2024 | Beck et al. | |

* cited by examiner

ADJUSTABLE HIDDEN PANEL FOR DOWNLIGHT ATTACHMENT IN METAL CEILING

CROSS-REFERENCE TO RELATED APPLICATIONS

This application is a continuation-in-part of U.S. patent application Ser. No. 19/027,937 filed on Jan. 17, 2025, which is a continuation-in-part of U.S. patent application Ser. No. 18/738,136 filed on Jun. 10, 2024 (now U.S. Pat. No. 12,228,264), which claims priority to U.S. Provisional Application No. 63/521,331, filed on Jun. 15, 2023. The entire disclosures of the above applications are incorporated herein by reference.

FIELD

The present disclosure relates generally to a suspended ceiling system and, more particularly, to a lighting system that couples to a suspended ceiling system.

BACKGROUND

This section provides background information related to the present disclosure which is not necessarily prior art.

Suspended ceilings are used in many locations. Providing a convenient lighting source for a suspended ceiling is important. Also, providing a clean aesthetic for a light assembly is also important. For suspended ceilings, lighting is typically assembled on site. Electricians and other tradesman spend a lot of time in the assembly of a ceiling and a light fixture. Junction boxes, network interfaces and other devices are typically individually assembled. This increases the overall cost of the project.

Oftentimes, the suspended ceiling has ceiling tiles, some of which are to be provided with light fixtures. Installing a light fixture behind a ceiling tile can be time consuming. To maintain the finished look, the light fixture must be aligned properly relative to and affixed within the openings. Sometimes, the light fixture is provided by another supplier as the ceiling system which can increase alignment issues.

SUMMARY

This section provides a general summary of the disclosure and is not a comprehensive disclosure of its full scope or all of its features.

In one aspect of the disclosure, a light fixture assembly for assembly into a ceiling component channel includes an elongated tray comprising a base comprising a first side, a second side and a first opening through the base. The elongated tray further has a first longitudinally extending wall extending from the second side of the base and a second longitudinally extending wall extending from the second side of the base. The first longitudinally extending wall having a first coupler. The second longitudinally extending wall having a second coupler extending inwardly toward the first longitudinally extending wall. A first adjustable bracket includes a first portion coupled to the first coupler and a second portion coupled to the second coupler. The first portion and the second portion couple the elongated tray to the ceiling component channel. The light fixture assembly further includes a light assembly. A coupling assembly couples the light assembly to the elongated tray. The coupling assembly is positioned around the first opening and adjacent to the second side of the base.

In another aspect of the disclosure, a light fixture assembly for assembly into a ceiling component channel includes an elongated tray comprising a base comprising a first side, a second side and a first obround opening through the base. The elongated tray further comprises a first longitudinally extending wall extending from the second side of the base and a second longitudinally extending wall extending from the second side of the base. The first longitudinally extending wall has a first coupler and a third coupler. The second longitudinally extending wall has a second coupler and a fourth coupler extending inwardly toward the first longitudinally extending wall. A first adjustable bracket includes a first portion coupled to the first coupler and a second portion coupled to the third coupler. A first portion and the second portion couples the elongated tray to the ceiling component channel. A second adjustable bracket includes a third portion coupled to the third coupler and a fourth portion coupled to the fourth coupler. The third portion and the fourth portion couple the elongated tray to the ceiling component channel. The light fixture assembly further includes a light assembly. A coupling assembly couples the light assembly to the elongated tray. The coupling assembly is positioned around the first opening and adjacent to the second side of the base.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1A:
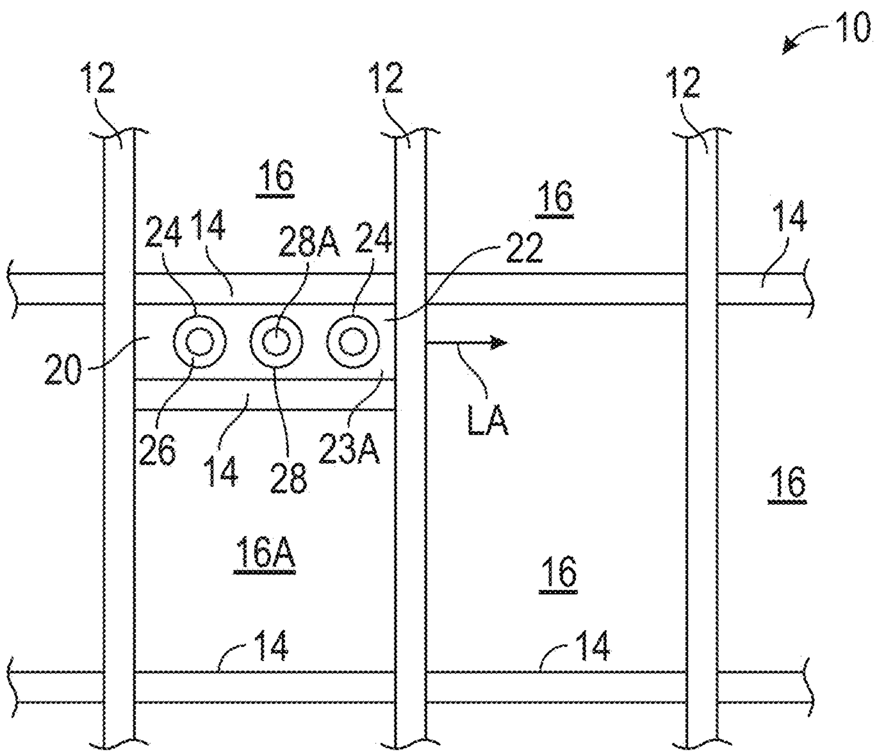
FIG. 1A is an underside (finished side) view of a ceiling system.

Referring now to FIG. 1A, an upward view of a ceiling system 10 is set forth. The ceiling system 10 has a plurality of members 12 that are parallel to each other and spaced apart from each other. The members 12 have cross members 14 disposed therebetween. The members 12 and cross members 14 are suspended below a building structure by wires (not shown). The cross members 14 are used to support ceiling tiles 16. A longitudinally shortened ceiling tile 16A is illustrated adjacent to a light fixture assembly 20. The light fixture assembly 20 is supported by two spaced apart cross members 14. The light fixture assembly 20 has a tray 22 that is finished in a finished material such as painting to provide an aesthetically pleasing surface. A longitudinal axis LA of the light fixture assembly 20 is illustrated.

Figure 1B:
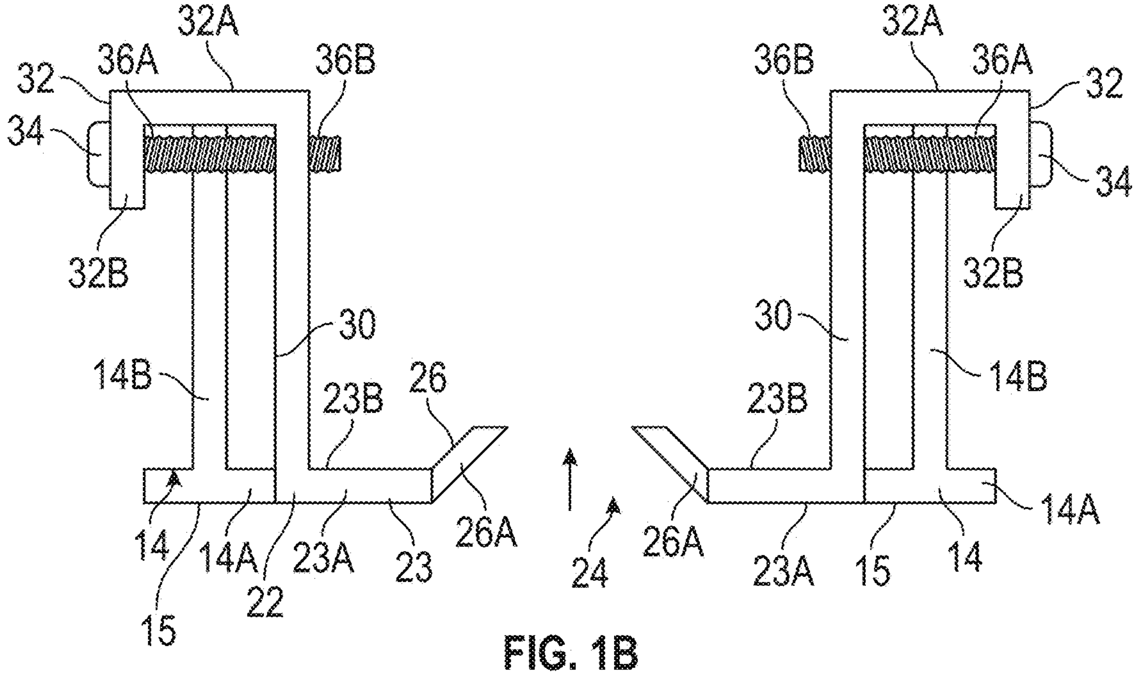
FIG. 1B is a cross-sectional view of the couplers for coupling the light fixture assembly to the cross members.

Referring now also to FIG. 1B, the elongated tray 22 has a planar base 23 with at least one opening 24 that is used to receive a baffle 26. The base 23 has a first side 23A and a second side 23B. In the present example, two openings 24 are provided. However, one opening or more than two openings 24 may be provided in a light fixture assembly 20. The cross members 14 have a planar member 14A and an upright member 14B. The planar member 14A has a surface 15 that may be coplanar with the first side 23A of the of the base 23. In FIG. 1B the surface 15 and the side 23A are also flush. Coplanar and/or flush makes the system the aesthetics of the system increase. The planar member 14A and the upright member 14B may be perpendicular as illustrated in the present example. They may be referred to as a tee support. The planar member 14A may be coplanar and flush with the tray 22 and the downward-facing or lowermost edge 26A of the baffle 26. This feature is described in greater detail below.

Another opening 28 may be formed in the base 23. Although the opening 28 is illustrated between two openings 24, the opening 28 may be located in various locations on the base 23. The opening 28 may be many sizes and shapes although round may be common. The opening 28 may be sized to have a component 28A therein or therethrough. The component 28A may be a sensor or another type of component such as but not limited to a wireless node, a smoke detector, fire detector, a gas sensor, a humidity sensor, an occupancy sensor, a light sensor and a temperature sensor.

The tray 22 has two longitudinally extending walls 30 that extend from the second side 23B of the base 23. The longitudinally walls 30 are coupled to the cross members 14 at a coupler 32. In this example, the four couplers 32 comprise a first wall 32A that extends outward or perpendicular, in this example, from the longitudinally extending walls 30. A second wall 32B extends outward or perpendicular in this example from the first wall 32A. In this example, the second wall 32B is parallel to the longitudinally extending wall 30. However, different angles may be set forth. In general, the longitudinally extending wall 30, the first wall 32A and the second wall 32B form a U-shaped channel. In the present example, the first wall 32A is positioned adjacent to the upright member 14B so that the entire tray 22 is supported between the two cross members 14.

A fastener 34 may extend into the second wall 32B through the upright member 14B of the cross member 14 and into the longitudinally extending wall 30. The fastener 34 may be one of a variety of types of fasteners including a nail, a bolt, a rivet or the like. The fastener 34 may be disposed within a fastener opening 36A in the second wall 32B and a fastener opening 36B within the longitudinally extending wall 30. The fastener 34 may be removable.

Figure 2A:
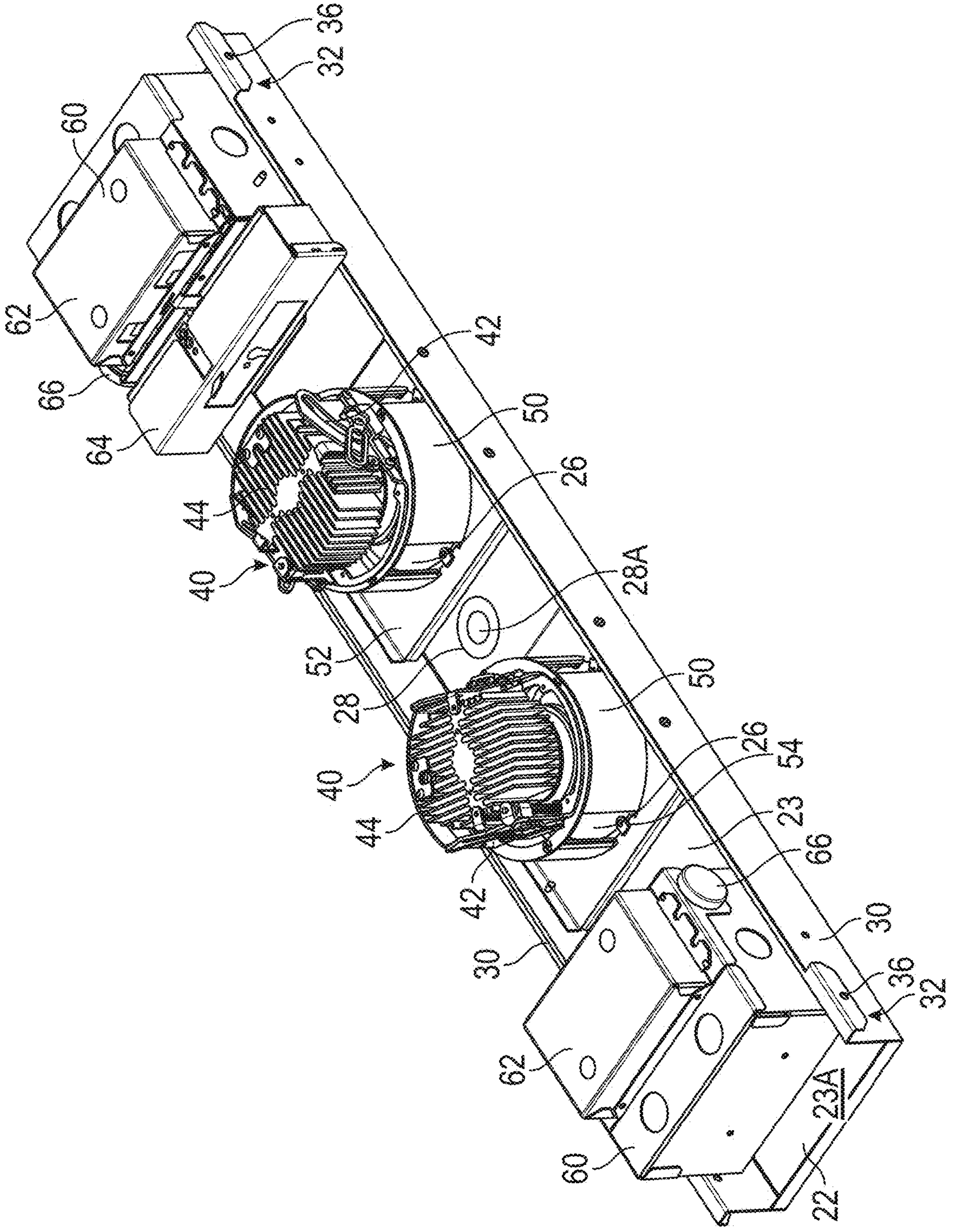
FIG. 2A is a top perspective view of the light fixture assembly having a shunt, junction box and driver box.
Figure 2B:
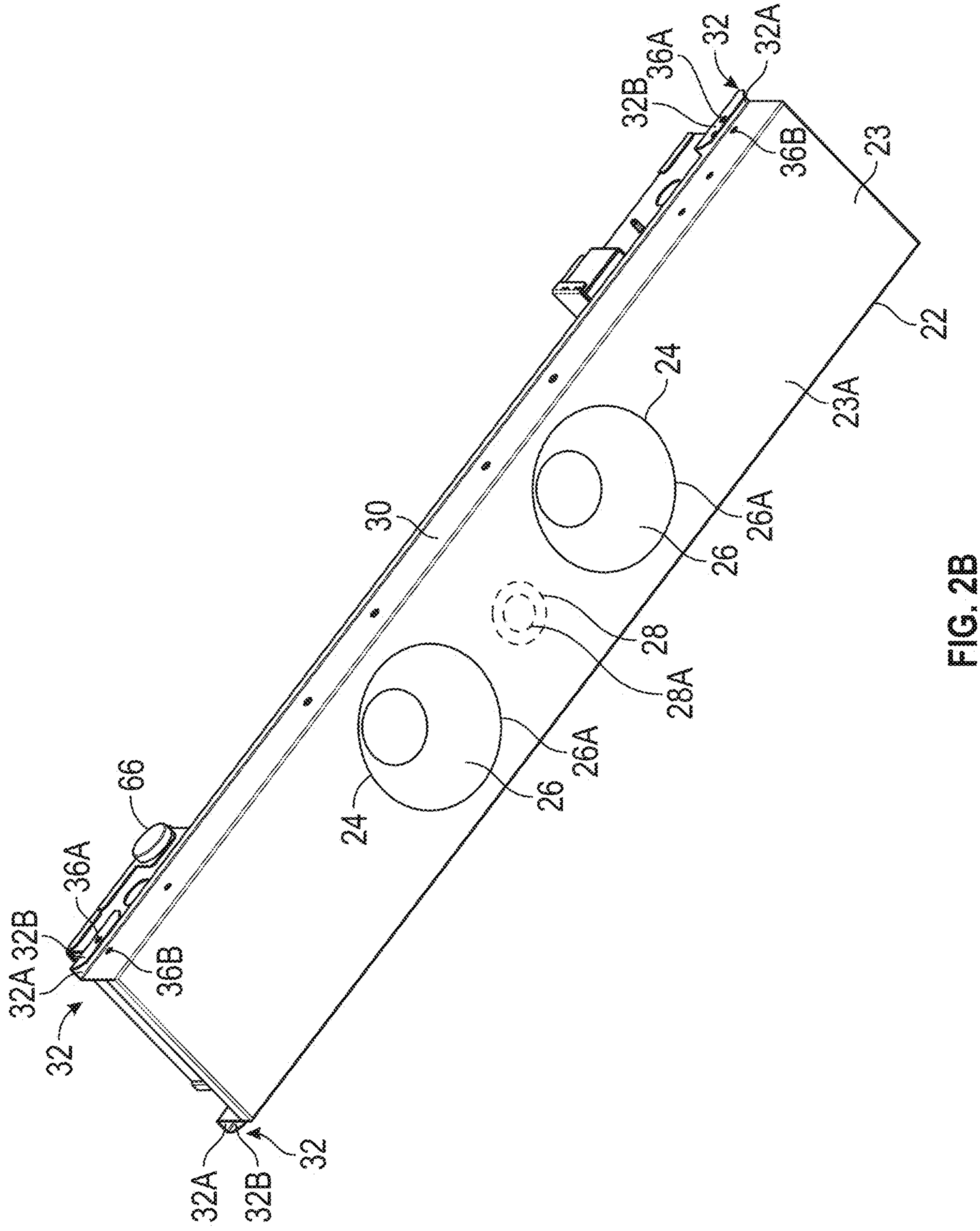
FIG. 2B is a bottom view or finished view of the light fixture assembly.

Referring now to FIGS. 2A and 2B, the inside and the underside of the light fixture assembly 20 is set forth. The light fixture assembly 20 has two light assemblies 40 in this example. However, various numbers of light assemblies 40 may be provided. The light assembly 40 has a coupling mechanism 42 that is used for coupling a heat sink 44 and the other lighting components to the tray 22 as will be described in greater detail below. The coupling mechanism 42 is positioned adjacent a support 50. The support 50 is sized so that the lighting components and the baffle 26 are accommodated therein. A clamp 52 is positioned adjacent to a trim piece 54. The support 50, the clamp 52 and the trim piece 54 are described in greater detail below. In another example, the couplers 32 may extend longitudinally along most of the longitudinally extending wall 30 so only two are required.

The tray 22 may also have one or more junction boxes 60 coupled thereto. In this example, two junction boxes 60 are coupled to the tray 22. The junction boxes 60 are used for making an electrical connection to the building. Wires from the building are received therein.

A driver box 62 is also coupled to the tray 22. In this example, the driver box 62 is mechanically coupled to the tray 22 through the junction box 60. The driver box 62 is used to house a driver for driving the light emitting diodes of the light assembly 40. Electrical connections are made between the driver in the driver box 62 and the wires in the junction box 60.

A shunt 64 may also be coupled to the tray 22. The shunt 64 may be coupled directly to the tray or to the junction box 60. The shunt 64 is described in greater detail below. The shunt 64 allows the power supplied to the light assembly 40 to be switched to a backup power source such as a battery or another alternate source such as generator power.

A wireless node or network interface 66 may act as a controller for controlling the various aspects of the light fixture assembly 20. That is, the network interface 66 may also act together with a controller for turning on and off one or both of the lights or dimming the lights in the light fixture assembly 20. It should be noted that both junction boxes 60 may include the network interface 66. One example of a network interface is an ATHENA®.

Figure 3:
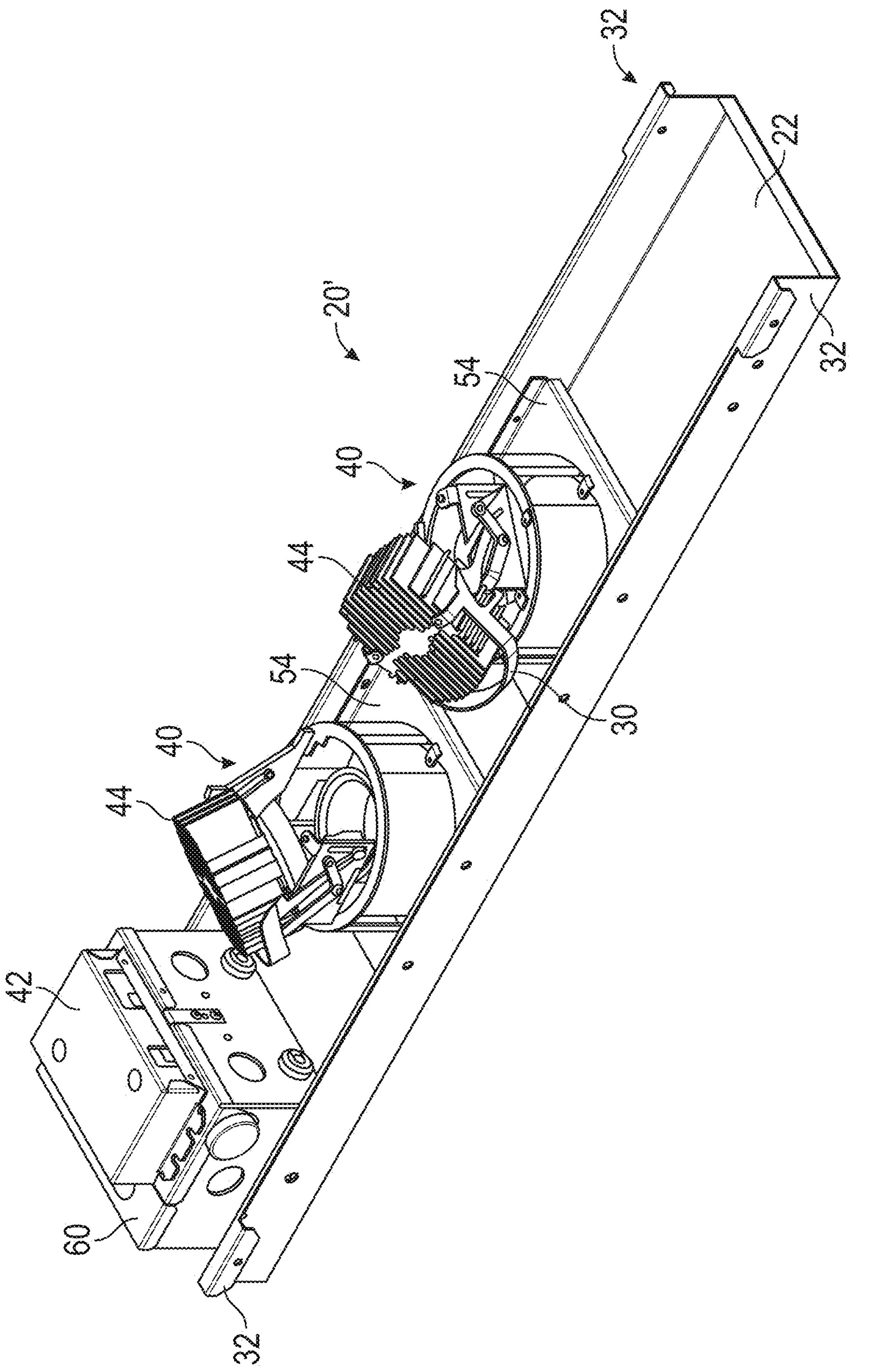
FIG. 3 is a perspective view of a light fixture assembly having a single junction box.

Referring now to FIG. 3, a similar example of a light fixture assembly 20' to that illustrated in FIGS. 2A and 2B is set forth. In this example, the tray 22 includes a single junction box 60 and a single driver box 62. Of course, a shunt box 64 may also be coupled to the tray 22.

Figure 4:
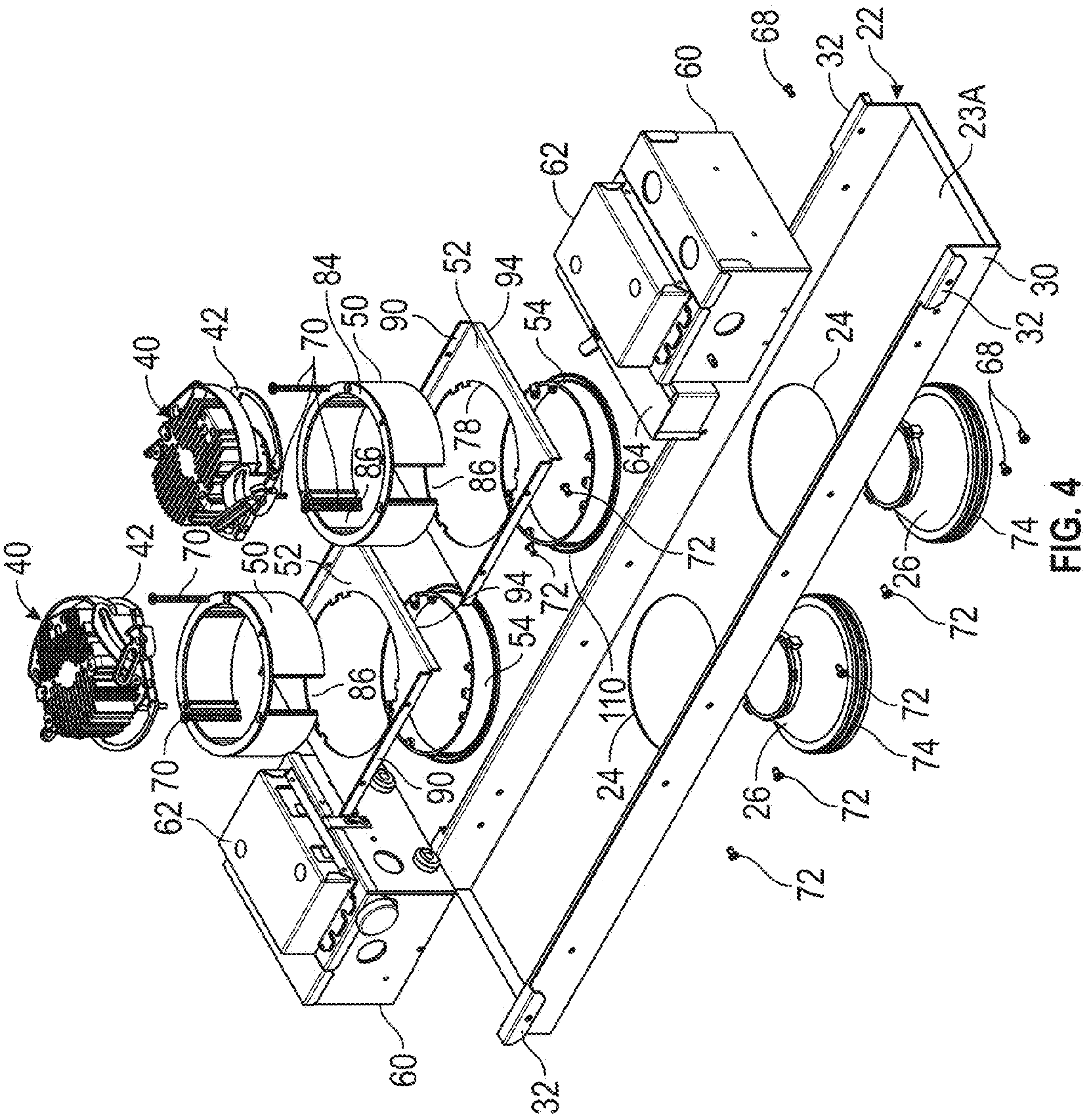
FIG. 4 is a partially exploded view of the light fixture assembly of FIG. 2A.

Referring now to FIG. 4, a partial exploded view of the light fixture assembly is set forth. The junction boxes 60 may be secured to the tray 22 and, in particular, to the longitudinally extending wall 30 by fasteners 68. The fasteners 68 may be rivets, screws bolts or the like.

In FIG. 4, the relative position of the light assembly 40, the clamp 52, the trim piece 54 and the support 50 are illustrated. The support 50 is coupled to the trim piece 54 using fasteners 70.

The clamp 52 is also fastened to the longitudinally extending walls by fasteners 72. The fasteners 72 may be screws, rivets, bolts or the like.

The baffles 26 have a seal 74 that is used for providing a friction fit and coupling the baffle to the trim piece 54.

Figure 5A:
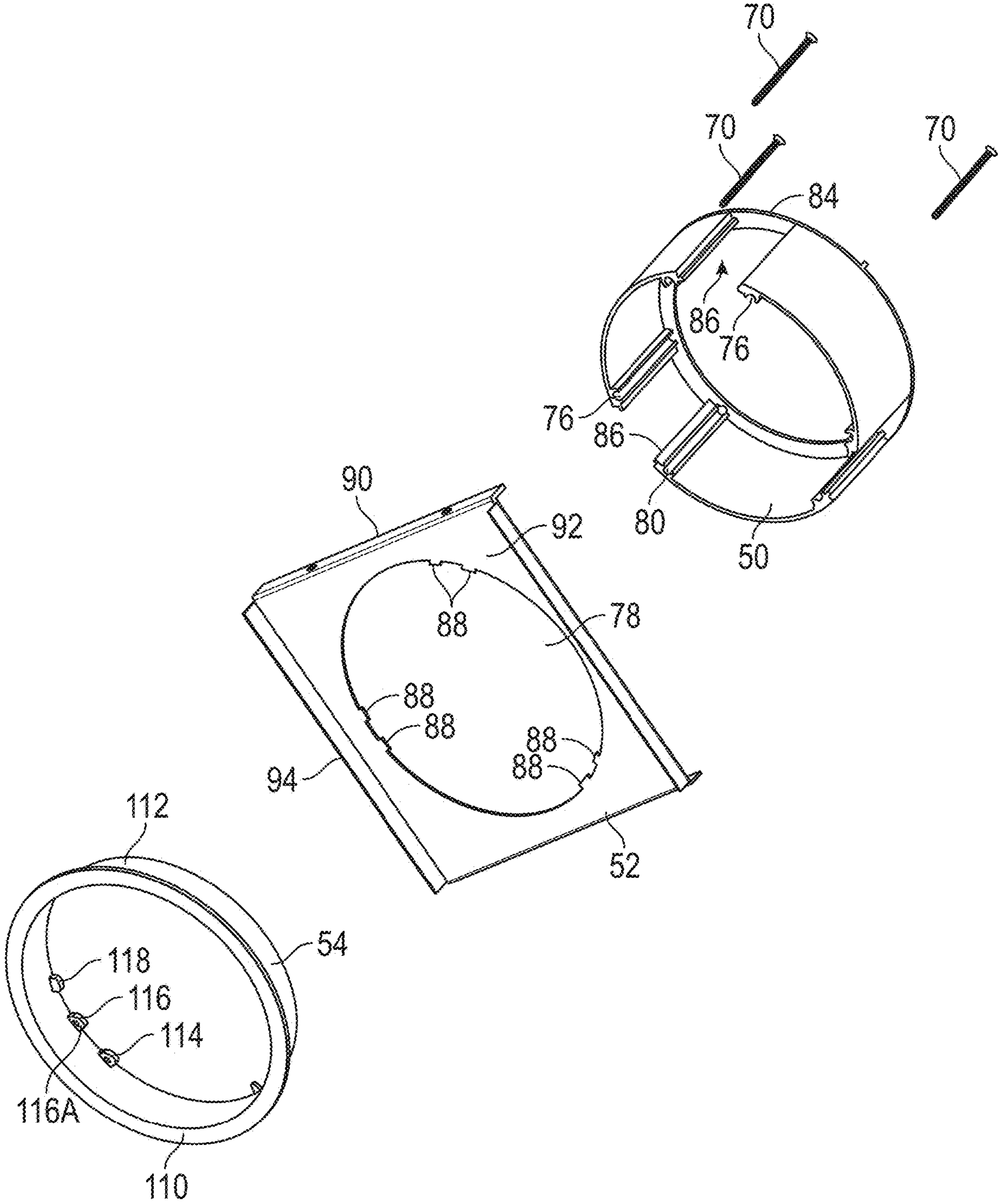
FIG. 5A is an exploded underside view of the support, clamp and trim piece.
Figure 5B:
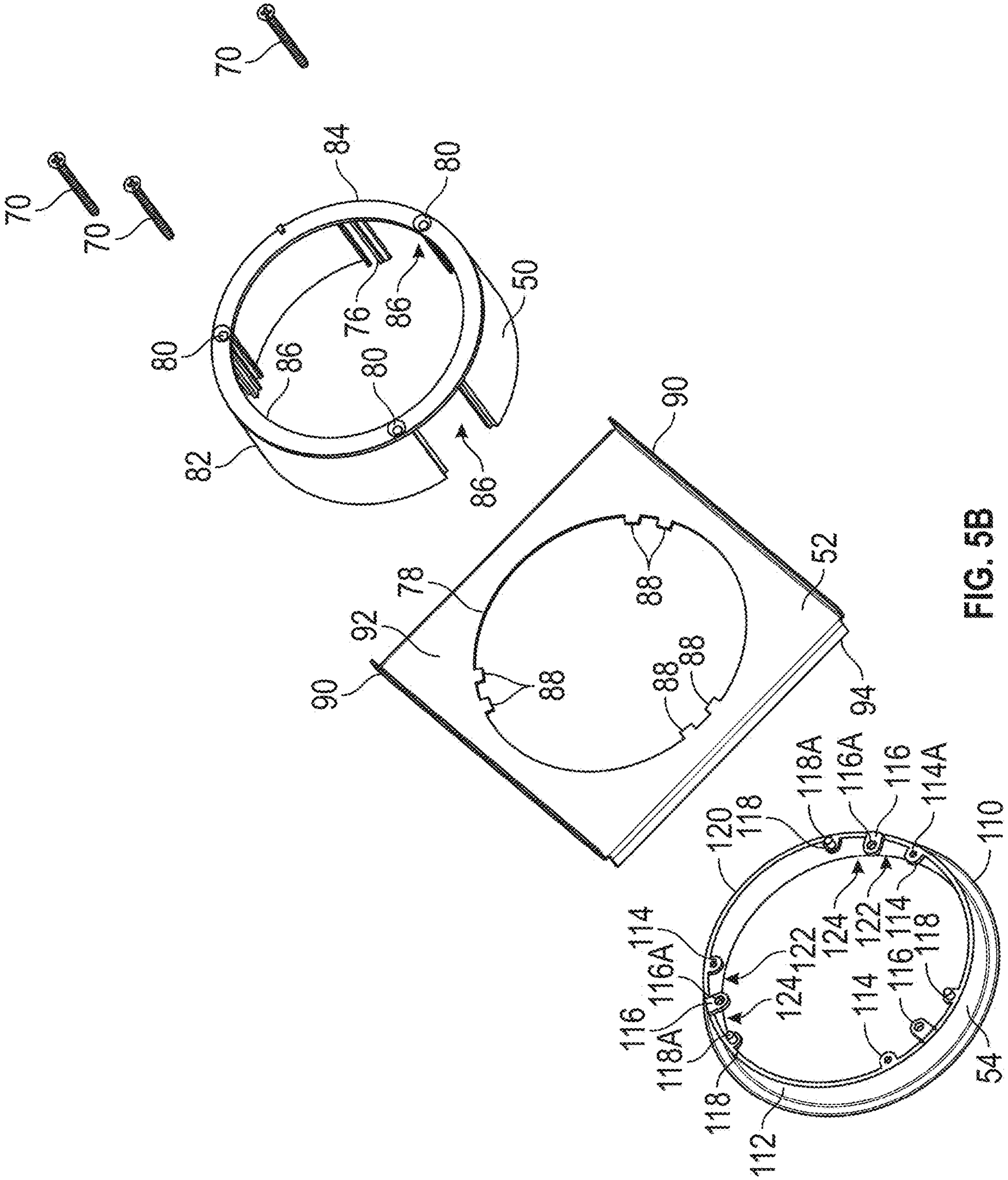
FIG. 5B is an exploded top view of the support, clamp and trim piece.
Figure 5C:
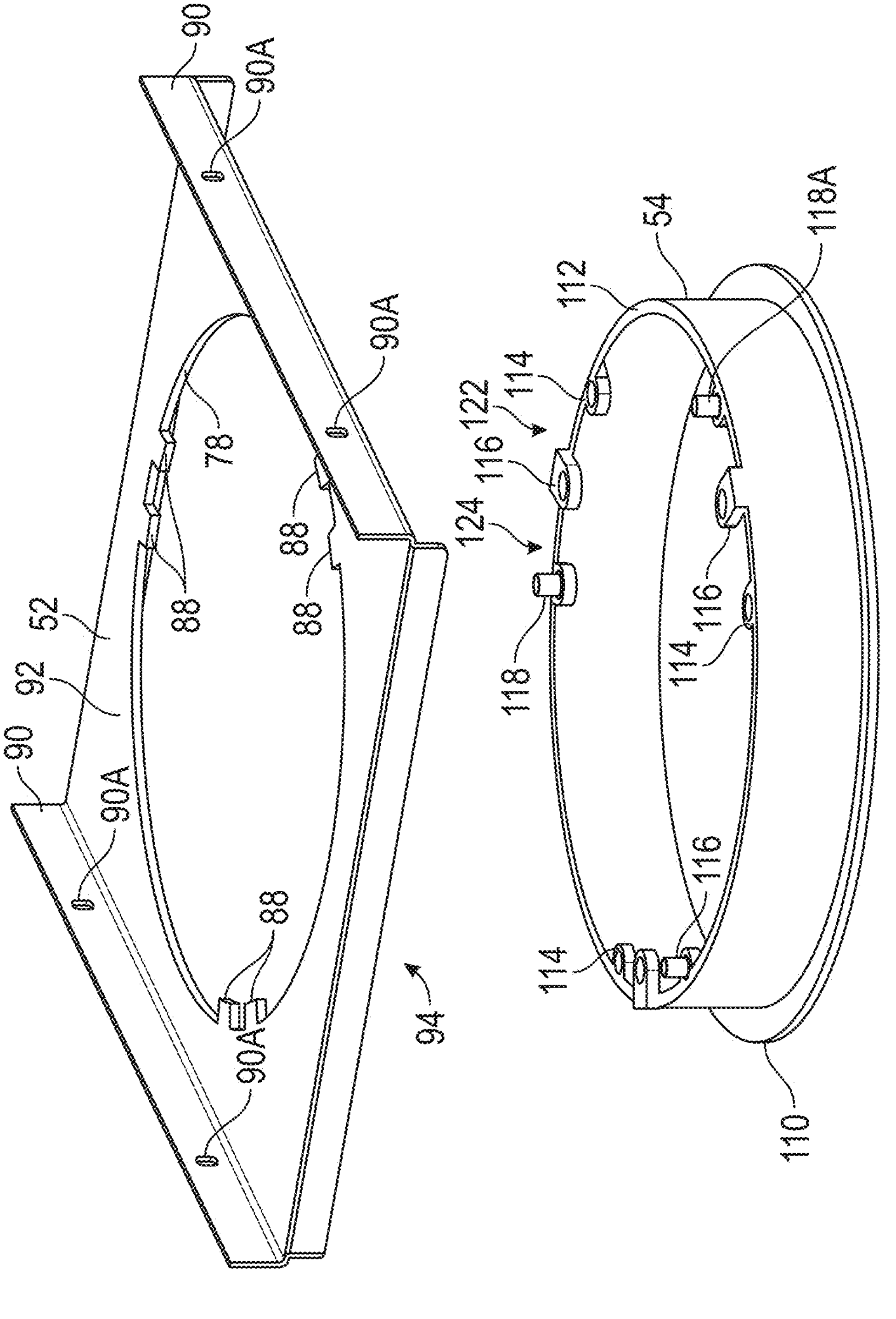
FIG. 5C is an exploded perspective view of the trim piece and the clamp.

Referring now also to FIGS. 5A-5C, details of the support 50, clamp 52 and trim piece are set forth. FIG. 5A illustrates the relative position of the trim piece 54, the clamp 52 and the support 50 from the bottom perspective. FIG. 5B shows these components from the top perspective. Likewise, FIG. 5C shows the clamp 52 and the trim piece 54 from the top perspective. When assembled, the trim piece 54 is sized to be received within the openings 78 of the clamp 52. The fasteners 70 are received within channels 80 that are formed in an outer wall 82 of the support 50. An upper ring 84 extends around the support 50. The outer wall 82 is discontinuous in that a space 86, in three locations in this example, is disposed between different portions of the outer wall 82.

The clamp 52 has tabs 88 that align with the space 86 when assembled. In this example, two tabs 88 are positioned within each of the spaces 86. Although two tabs 88 are illustrated, one tab 88 or more than two tabs 88 may be provided.

The clamp 52 has a pair of flanges 90 that extend from a planar surface 92. The flanges 90 have openings 90A that are used for receiving the fasteners 72 as mentioned above. The flange 90, in this example, extends on a plane that is normal to or perpendicular to the planar surface 92.

The planar surface 92 also has flanges 94 in the opposite direction as the flanges 90. The flanges 94 may be sized to accommodate the trim piece 54 between the planar surface 92 and the base 23 of the tray 22. The flange 94, in this example, is perpendicular to the planar surface 92 in the opposite direction as the flange 90.

The trim piece 54, in this example, is formed as a ring. The trim piece 54 has a flange 110 that, when assembled, is positioned against the second side of the base 23 of the tray 22. The trim piece 54 has an outer wall 112. The outer wall 112 extends in a direction perpendicular to the flange 110. The outer wall 112, in this example, is a cylindrical wall.

In this example, the outer wall 112 has a plurality of extensions radially extending inward therefrom. The extensions 114 and 118 are used to support the support 50. The extension 114 has an opening 114A extending therethrough. The opening 114A is sized to receive the fastener 70 that extends through the channels 80 in the outer wall 82 of the support 50. The extension 118 has a pin 118A that extends in an axial direction toward the support 50. The pin 118A is received within a support groove 76 of the support 50. The extensions 114 and 118 have a surface that is flush with a top edge 120 of the trim piece 54. The top edge 120 is directly adjacent to the outer wall 82. The extension 116 has an opening 116A. A space 122 is disposed between the extension 114 and 116. The space 122 is sized to receive one of the tabs 88. Likewise, a space 124 is disposed between extensions 116 and 118 and is sized to receive one of the tabs 88.

During assembly, the clamp 52 is positioned so that tabs 88 align with the spaces 122, 124. The spaces 86 are positioned so that the channels 80 align with the openings 114A so that the fastener engages the opening 114A. The height of the extension 116 prevents the tabs 88 from rotating during assembly. The pin 118A aligns with the support groove 76 to prevent the support from rotating. The extension 116 may be used for various coupling purposes.

Referring now to FIGS. 6A, 6B, 6C and 6D, the light assembly 40 relative to the support 50, the clamp 52 and the trim piece 54 are set forth. As can be seen best in FIG. 6A, the fasteners 72 extend through the longitudinally extending walls 30 so that the trim piece 54 is maintained in position. Because the support 50 is coupled to the trim piece 54, a coupling assembly 126 of the support 50, the clamp 52 and the trim piece 54 are formed. The coupling assembly 126 couples the light assembly 40 to the tray 22. The coupling assembly 126 is coupled to the tray 22 at the longitudinally extending walls 30. The coupling assembly 126 receives the baffle 26 which is removably coupled therein.

The baffle 26 may have a lens 130 that is retained to the baffle 26 by a lens retainer 132. One or more fasteners 134 may be used to hold the retainer 132 to the baffle 26 so the lens 130 is disposed therebetween.

A LED assembly 140 is spaced apart from an optically positioned adjacent to the lens 130. In a ray of LEDs 142 is positioned within the LED assembly 140. An optic 144 may be positioned at the optical outlet of the LED assembly 140 to direct light through the lens 130. The LED assembly 140 is thermally coupled to the heat sink 44. The LED assembly 140 and the heat sink 44 are coupled to the coupling mechanism 42. Arms 42A and 42B have guides 150A and 1500B that are used to guide the rotation of the heat sink 44 and the LED assembly 140 relative to the tray 22, baffle 26 and the lens 130. As mentioned above, the configuration of the coupling mechanism 42 may vary depending upon the various light conditions. Likewise, the baffle 26 and the corresponding opening 24 may also vary in size and shape. For example, although a round baffle and round shape is illustrated for all the components, square or rectangular baffles 26 may be used.

Figure 6A:
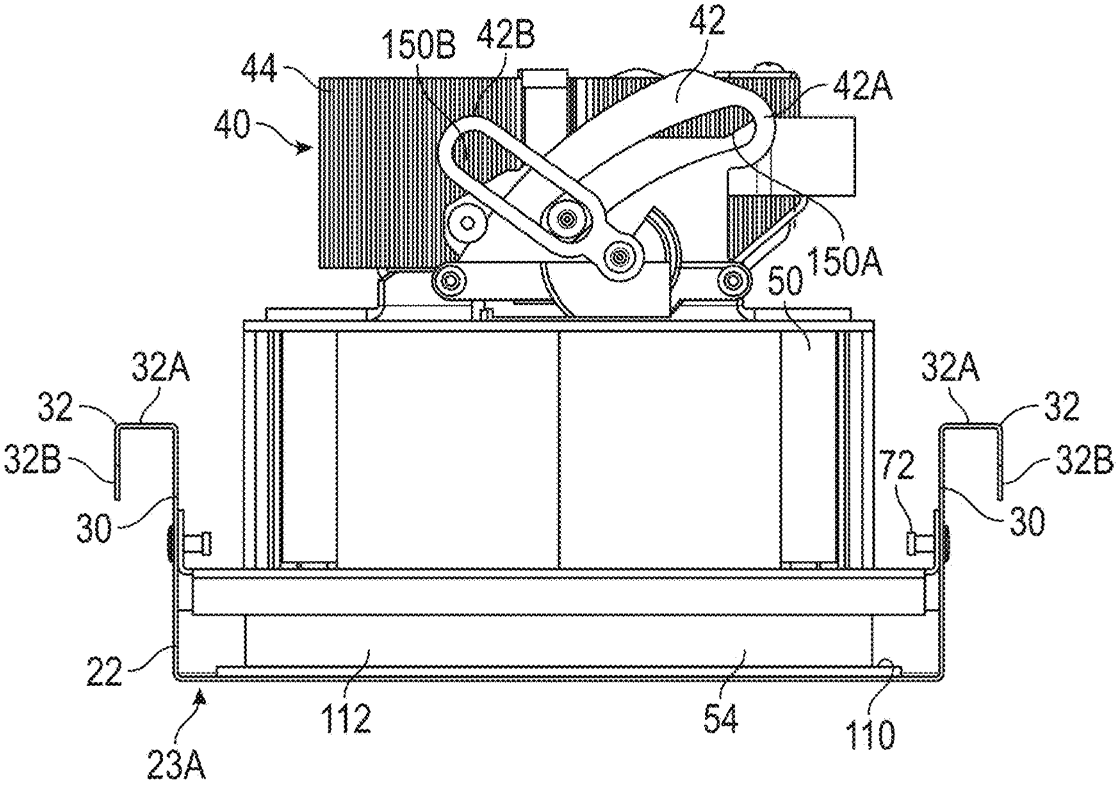
FIG. 6A is a side view of the light assembly relative to the trim piece, clamp and support in an assembled and non-tilted position.
Figure 6B:
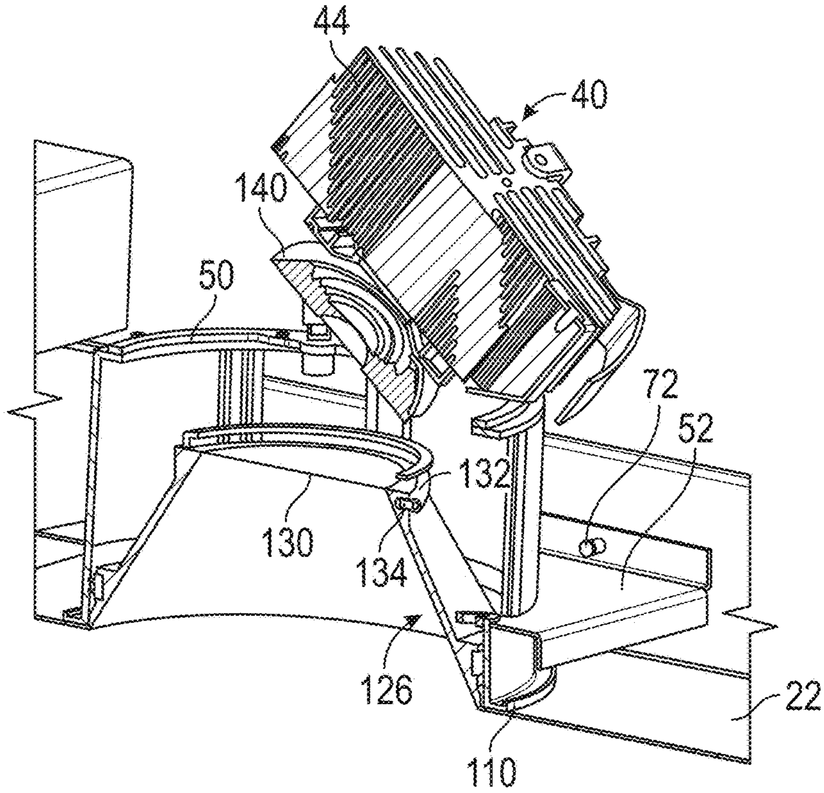
FIG. 6B is a perspective view of the light assembly with the coupling mechanism in a tilted position.
Figure 6C:
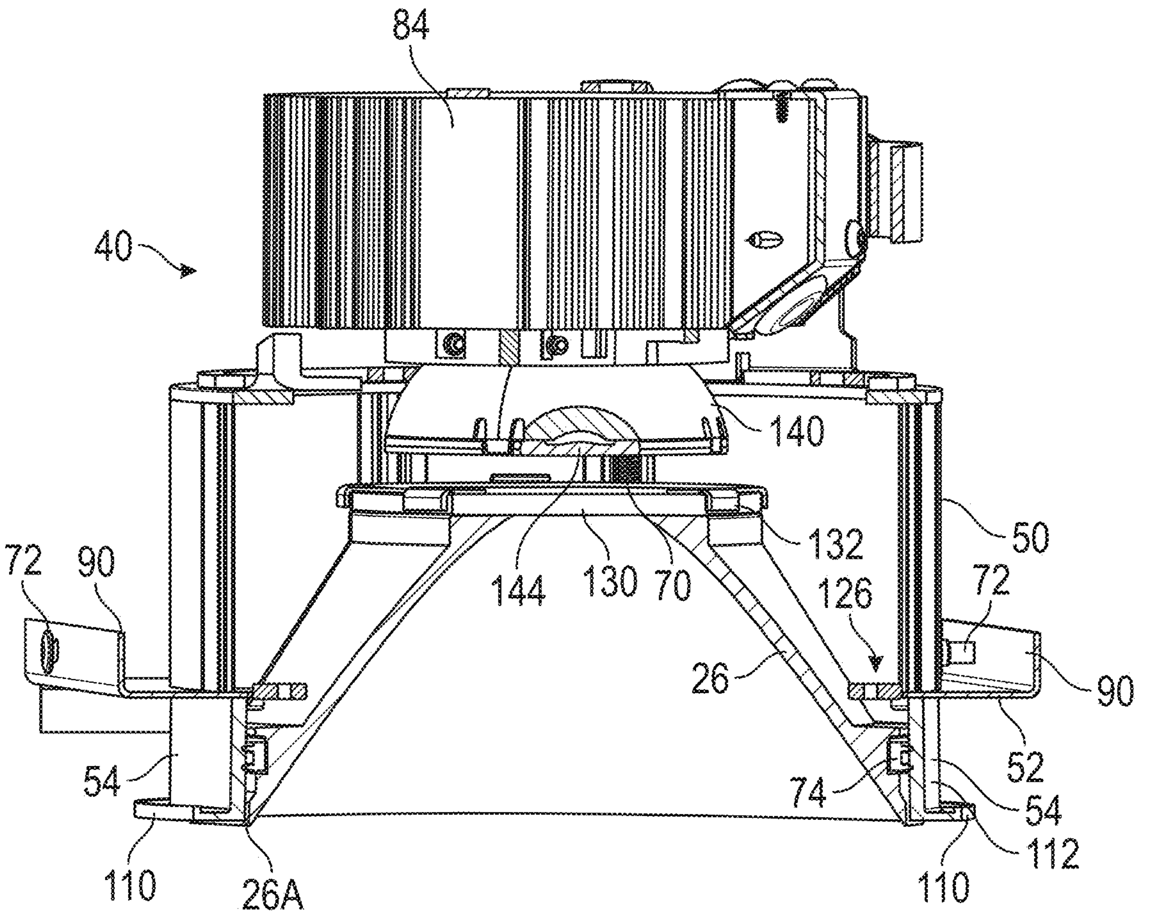
FIG. 6C is a cross-sectional view of the light assembly relative to the support, clamp, trim piece, lens and baffle.
Figure 6D:
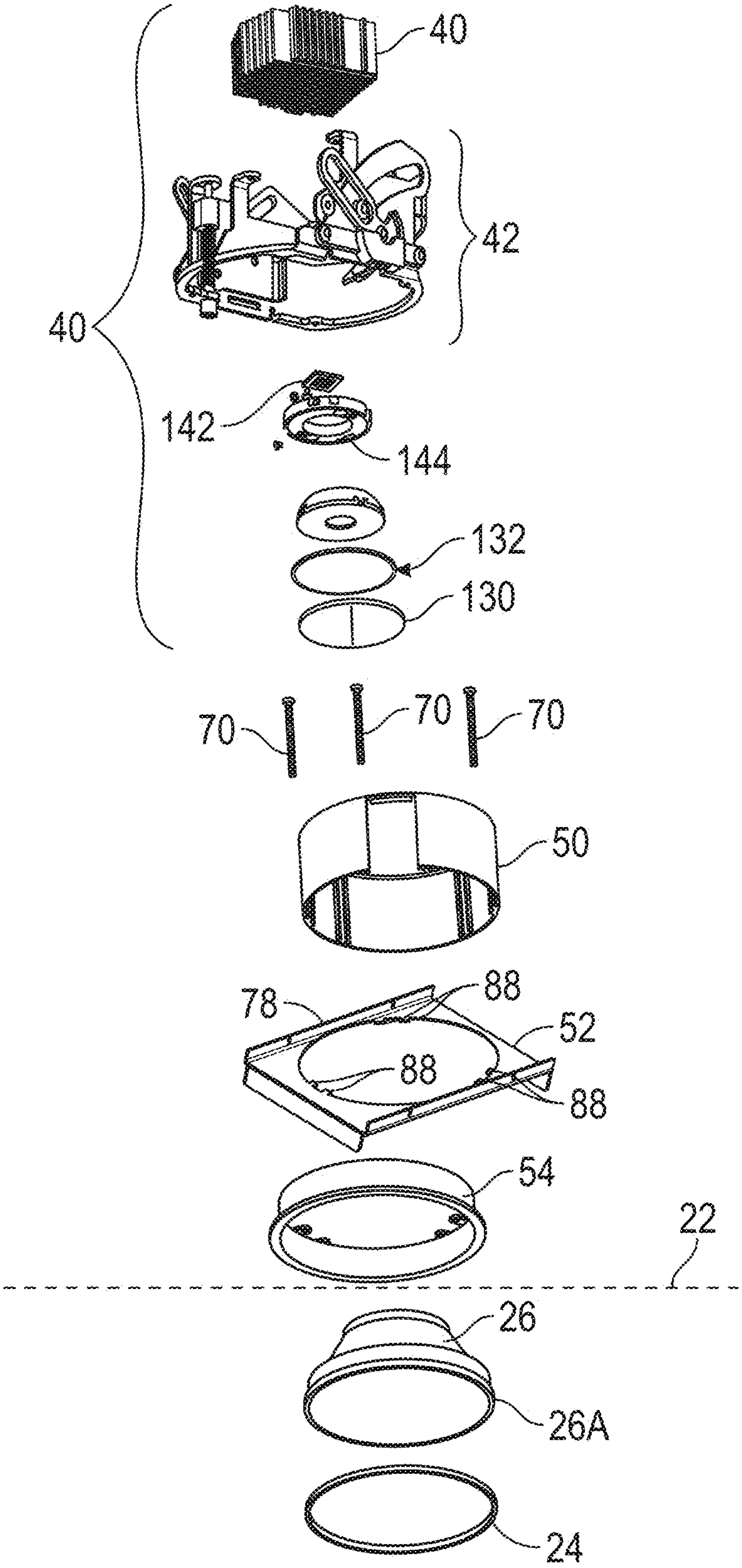
FIG. 6D is an exploded view of the light fixture assembly without the tray.
Figure 6E:
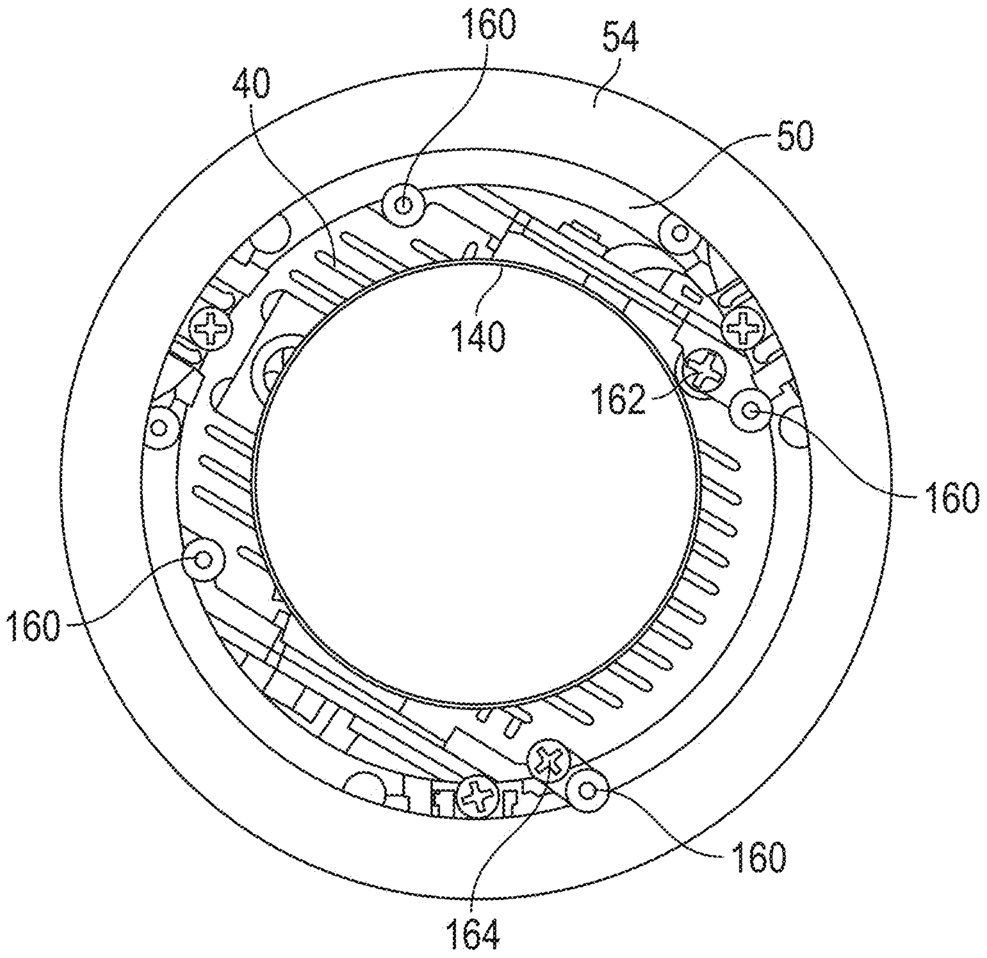
FIG. 6E is a bottom view of the light assembly with the baffle removed.

Referring not to FIG. 6E, a view into the light fixture assembly 20 is set forth. In this example, fasteners 160 couple the coupling mechanism 42 to the support 50. In this example, four screws are used as the fasteners 160. The coupling mechanism 42 may be tilted by rotating the tilt screw 162 and rotated using a rotation screw 164. In this manner, the angle and rotation of the light direction may be set.

Figure 7:
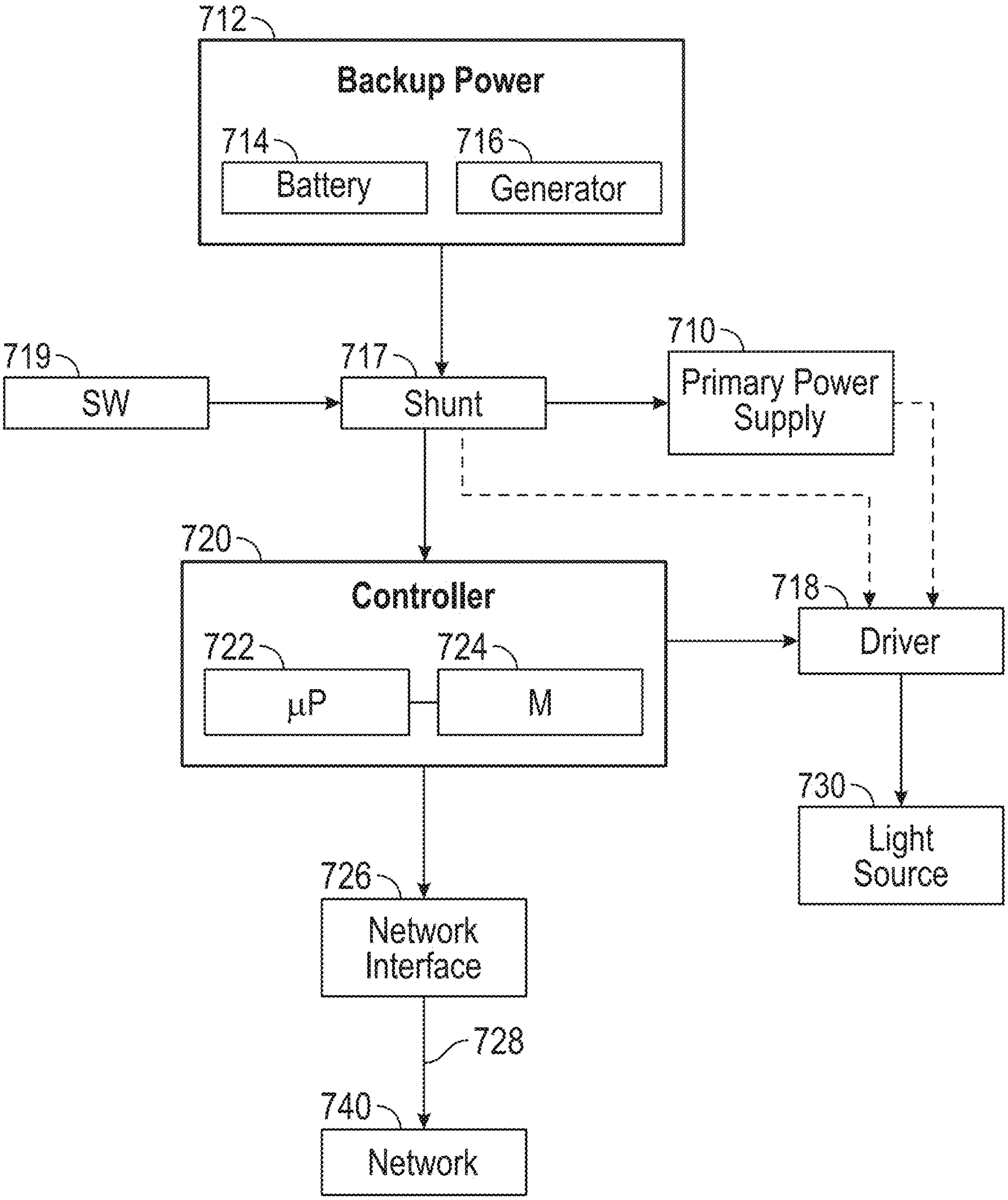
FIG. 7 is a block diagrammatic view of the circuitry of the light fixture assembly.

Referring now to FIG. 7, a block diagrammatic view of a schematic of the system is set forth. In this example, a primary power supply 710 such as a building voltage, such as 110V, is set forth. The primary power supply 710 may be an AC power supply.

A backup power supply 712 is an optical feature and is illustrated in FIG. 7. The backup power supply may be a battery 714, a generator 716 or the like. The backup power supply may be either AC or DC. The backup power supply 712 and the primary power supply 710 may be coupled to a driver 718 directly or through a controller 720. The controller 720 has a microprocessor 722 and a memory 724 that is a non-transitory computer-readable medium that includes machine readable instructions that are executable by the processor 722. The controller 720 may communicate with a network interface 726 through an antenna 728. The antenna 728 communicates control signals to and from a network 740.

The driver 718 is used to drive the light source 730. The light source 730, as described above, may be the LED assembly 140 that has an array of LEDs 142. In the simplest version, the primary power supply 710 may be directly coupled to the driver 718. In more complex versions using the shunt 717, either the backup power supply 712 or the primary power supply 710 may be communicated to either the controller 720 or the driver 718. The shunt 717 may have switch 719 for activating the shunt to switch between the primary power supply and the or the backup power supply. The switch 719 may also be used for testing the shunt.

In operating, the installation of the light fixture assembly to the suspended ceiling system 10 is made to be relatively quick and simple by the integrated couplers. All the components for quick assembly may be provided. For servicing, an adjacent tile of the suspended ceiling may be moved to access the components to be replaced. However, servicing may also take place by removing the baffle. The shunt can be reached by removing the light assembly and reaching through the opening 24.

Figure 8A:
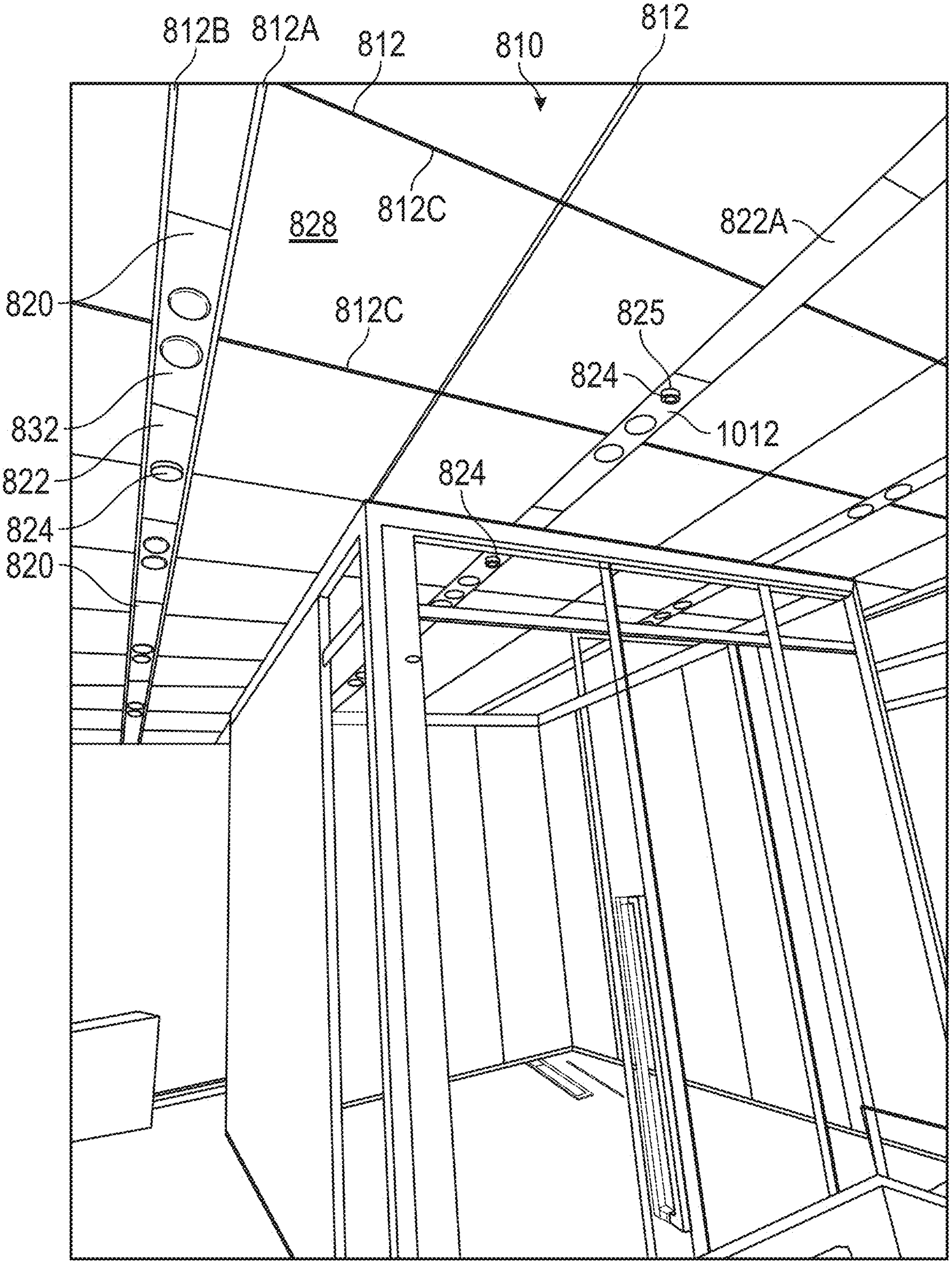
FIG. 8A is a perspective view of a ceiling assembly in a room.

Referring now to FIG. 8A, a ceiling system 810 is illustrated. In this example, a plurality of grid cross members 812 is illustrated. In this example, grid cross members 812A and 812B are disposed parallel to each other and are used to support light fixture assemblies 820 therebetween. Other grid cross members 812 like grid cross members 812C are perpendicular to grid cross member 812A and 812B and may or may not extend between the two parallel cross members supporting the light fixture assemblies 8120. In addition, panels 822 may be disposed between various light fixture assemblies 820. Panels 822 may be filler or blank panels as illustrated at 822A or may include a component 824 disposed through an opening 825 in the finished panel (such as the ceiling component channel 1012 below). The component 824 may be positioned in various places on the panel (or the ceiling component 1012 described below). The lengths of the light fixture assemblies 820 and the panels 822 may vary depending on design configurations and requirements. As will be described in greater detail, the light fixture assemblies 820 and the panels 822 may be flush and coplanar to provide a smooth uninterrupted design aesthetic.

Ceiling tiles 828 are suspended by one or more cross members 812, 812A, 812B and 812C. In this example, ceiling tiles 828 may be generally uniform in size. The bottom surface of the ceiling tiles may be coplanar with the first side of the base 832 of the light fixture assembly and also with the panel 822.

Figure 8B:
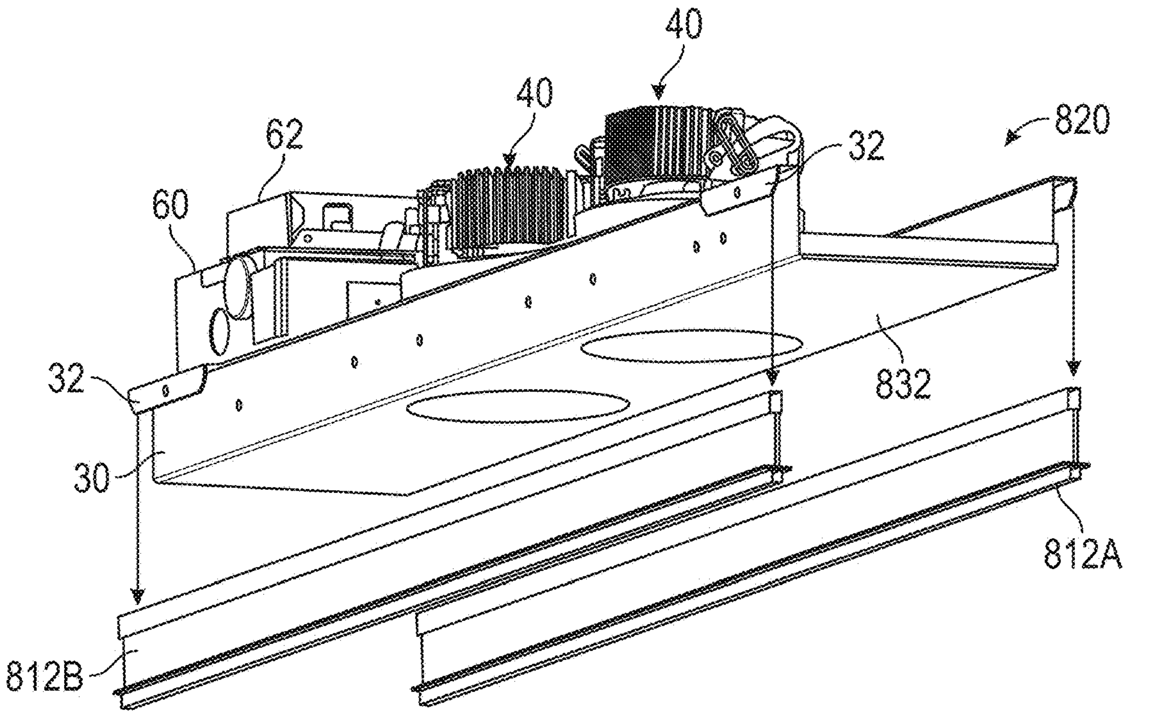
FIG. 8B is an enlarged perspective view of grid members exploded away from a light fixture assembly.

Referring now also to FIG. 8B, the details of the members 812A and 812B relative to the light fixture assemblies 820 are illustrated. The grid cross-members 812A and 812B have a lower surface 830A and 830B. The lower surface, in the example, is coplanar with the surface 832A of the light fixture assembly 820. Also, as illustrated in FIG. 80, the lower surface 828A of the ceiling tiles 828 may be configured to coplanar with lower surfaces 830A, 830B of the grid cross members 812A, 812B and the surface 832A of the base 832 of the light fixture assembly 820.

The present system enables the preassembled light fixture assembly to be positioned efficiently in place during the configuration and building out of a room area. The light fixture assemblies 820 and the lower surface 832A thereof may be painted in a particular shade and or texture to match the surrounding ceiling tiles 828. To assemble the light fixture assemblies 820 in place, an electrician merely has to connect the wires to the light fixture assembly rather than the typically cumbersome and time consuming method for cutting holes in ceiling tiles and inserting the light portions therein.

Figure 8C:
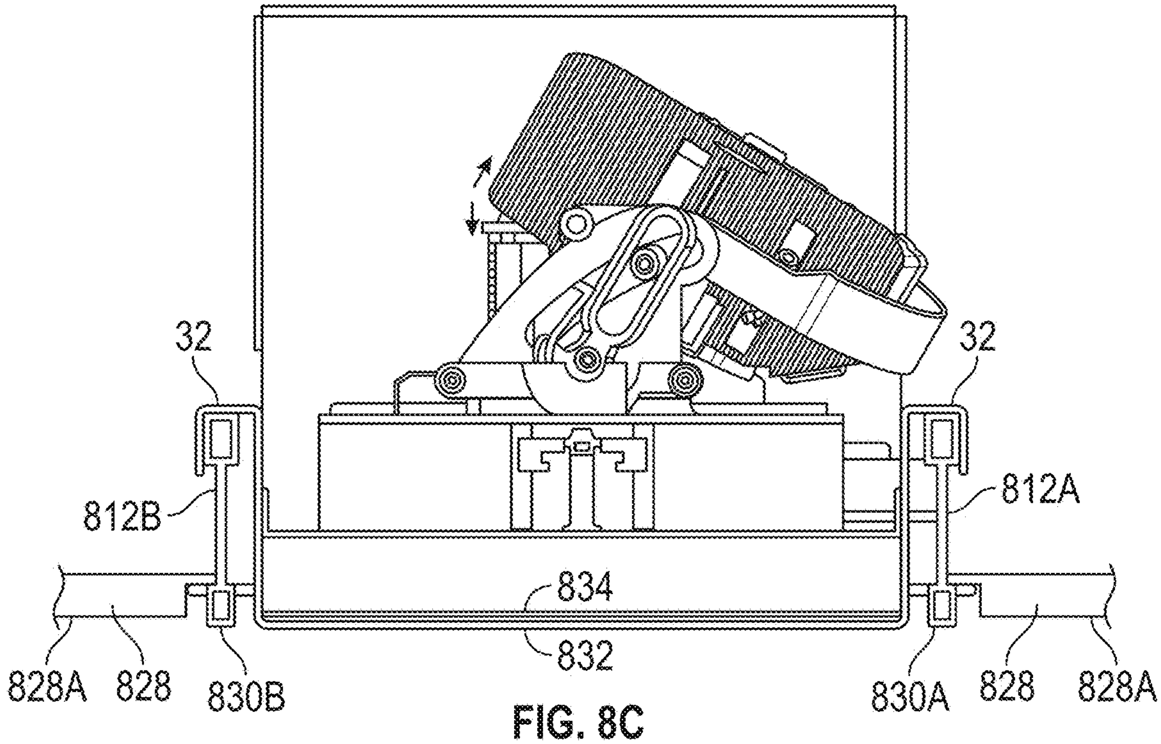
FIG. 8C is a side view a light fixture assembly illustrated fastened to grid members.
Figure 9:
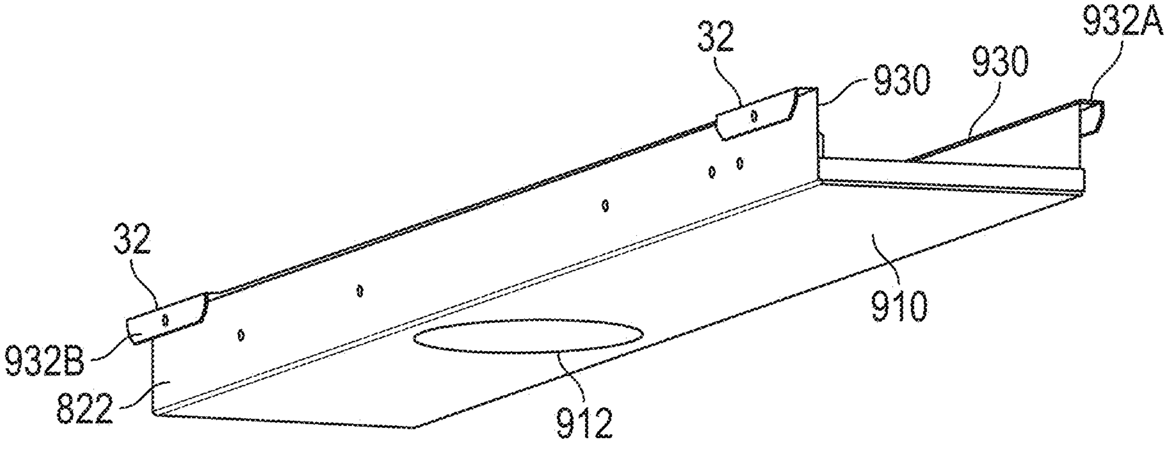
FIG. 9 is a perspective view of a panel according to the present disclosure.

Referring now to FIG. 8C, the panel 822 is illustrated in further detail. In this example, the panel 822 may be configured in a similar manner to the panels illustrated above without the light assemblies therein. In this example, the panel 822 has a base 910 with the couplers 932 that extend from the base 910 in a vertical direction. The configuration of the couplers 932 may have a first wall 932A that, in this example, extends horizontally from a side wall 930 when assembled. A second wall 932B extends parallel to the longitudinally and vertically extending walls 930 extending from the second side of the base 910. The panel 822 may be a blank panel or have various components 28A therein. The panel 822 may be held or suspended by the members 812A and 812B. However, as mentioned above, several types of components 28A (shown in FIG. 1A) may be disposed within an opening 912. The size, shape and number of the openings 912 may vary depending on the component characteristics and the desired number of components. The position of the components 28A may vary laterally and longitudinally within the panel 822. The panel 822 may also be used to support a pendulum light fixture.

By providing the light assemblies with preinstalled light fixtures therein, the look provides a sculptural cavity that is continuous with the ceiling opening from which light emanates. The custom look is not achievable without preinstalling the light fixture in the panel without extreme labor which is extremely expensive to perform at a job site. The field installation of the light assemblies of the present disclosure improves and expediates the assembly process of a ceiling assembly.

Figure 10A:
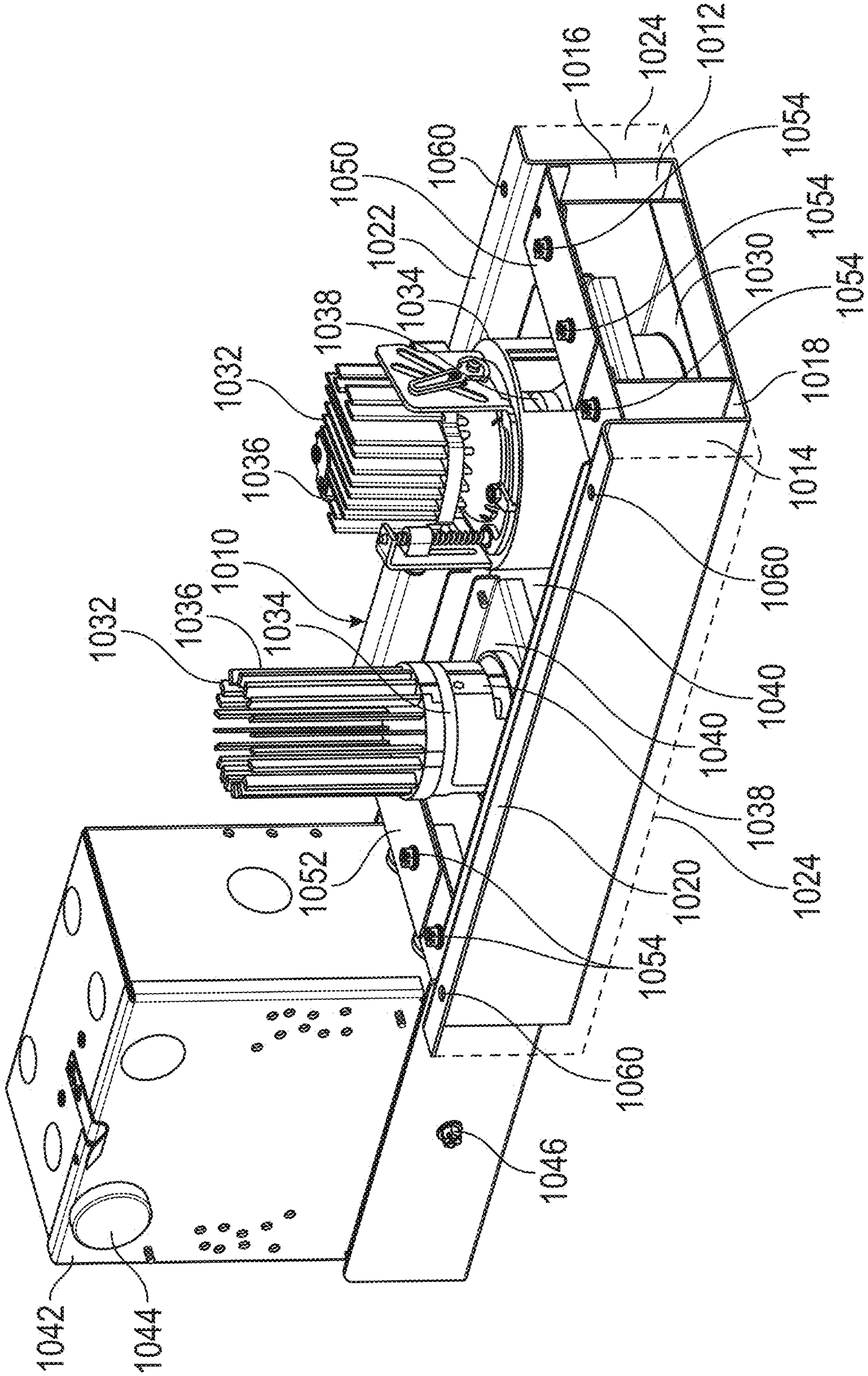
FIG. 10A is a perspective view of a first example of a ceiling component channel with a light assembly therein.

Referring now to FIG. 10A, another example of a light fixture assembly 1010 is illustrated in further detail. The light fixture 1010, in this example, is different than the light fixture as described above in that the light fixture 1010 may be configured to be received within a panel such as a ceiling component channel 1012. The ceiling component channel 1012 has a first longitudinal extending wall 1014 and a second longitudinal extending wall 1016. Each of the longitudinal extending walls 1014, 1016 is coupled to a base 1018. In the present example, the walls 1014 and 1016 are perpendicular to the base 1018 and extend in a longitudinal direction. The walls 1014 and 1016 have a flange 1020, 1022, respectively. The flanges 1020, 1022 may be coupled to cross members 1024 of a ceiling grid pattern. The ceiling component channel 1012 may correspond to the light fixture assemblies 820 shown in FIG. 8A. That is, in addition to the light fixture assembly, the ceiling component channels 1012 may be substituted, therefore.

The light fixture assembly 1010 has an elongated tray 1030 that is configured in a similar manner to that described above. The tray 1030, however, is received within the ceiling component channel 1012 to allow the bottom of the base 1018 to be the exposed finished panel. The base 1018 may be provided by a ceiling manufacturer while the tray 1030 and the components therein may be provided by a lighting manufacturer. The tray 1030 may be used to support light assemblies 1032. The light assemblies 1032 may include a coupling mechanism 1034, a heat sink 1036 and a baffle 1038. Of course, the configuration of the light assemblies 1032 may be formed in various ways. The light assemblies 1032 may include a clamp 1040 that may be used to position each of the light assemblies 1032 within the tray 1030 as will be described in greater detail below. The tray may also have one or more junction boxes 1042 coupled thereto. The junction boxes are shown in a simple form in FIG. 10A. However, other components such as a driver box and shunt may be coupled to the junction box 1042. A wireless node 1044 may also be coupled to the junction box 1042. The wireless node 1044 may be used to provide wireless control for the light assemblies 1032. The junction box 1042 may be used to make an electrical connection to the building. That is, wires from the building may be received within the junction box 1042. The junction box 1042 may be secured to the tray 1030 with one or more fasteners 1046. A first adjustable bracket 1050 and a second adjustable bracket 1052 are used to secure the tray 1030 to the ceiling component channel 1012. In particular, the adjustable brackets 1050, 1052 have fastener 1054 that couple the portions of the adjustable brackets 1050, 1052 together and couple the brackets to the tray 1030 as will be described in greater detail below. In FIG. 10A, openings 1066 on the flanges 1020, 1022 may be used to receive a fastener used for coupling the flanges 1020, 1022 and therefore the ceiling component channel 1012 to the cross members 1024.

Figure 10B:
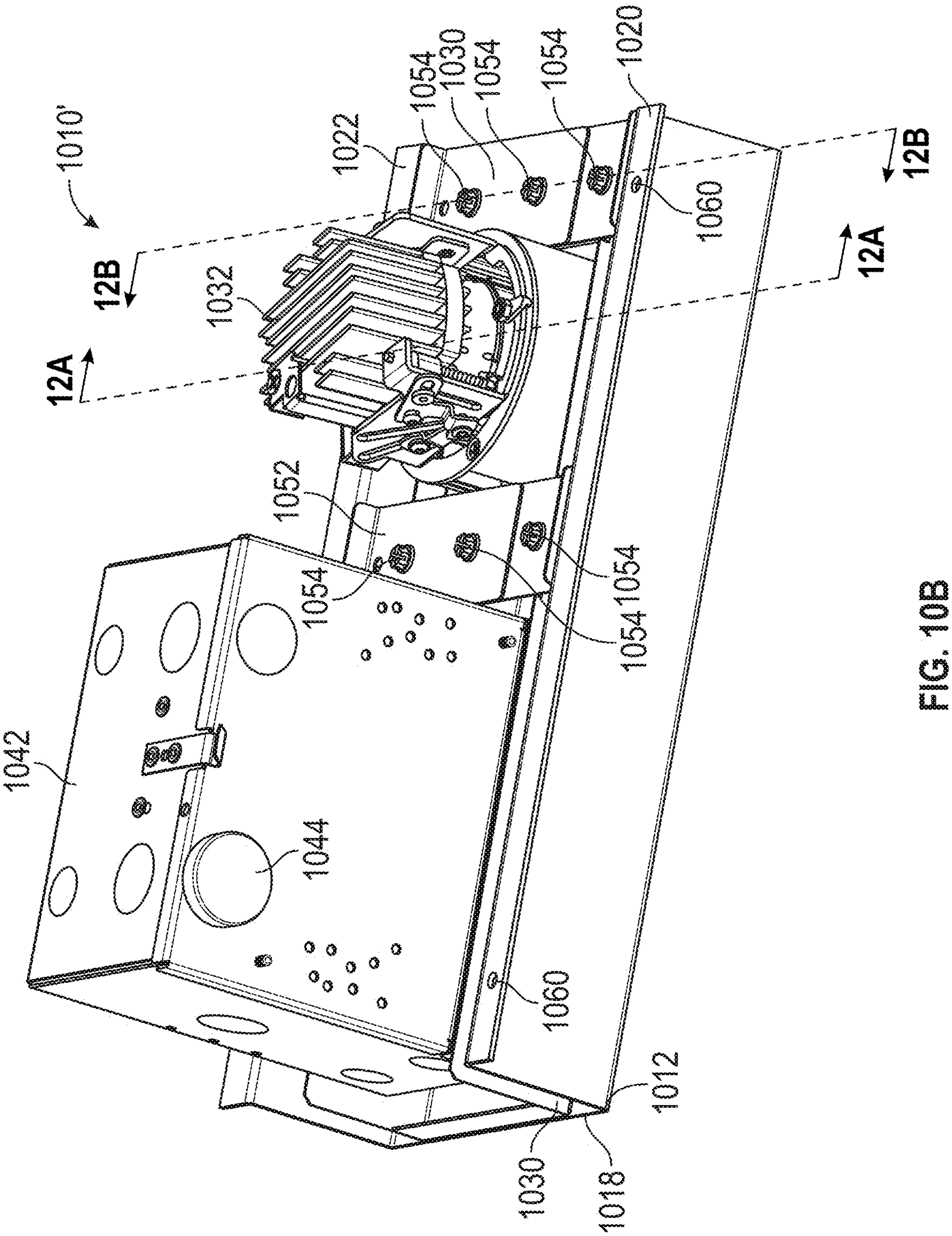
FIG. 10B is a second example of a ceiling component channel with only one light fixture therein.

Referring now to FIG. 10B, a second example of a light fixture assembly 1010' is illustrated in further detail. In this example, the location of the junction box 1042 is located where the second light assembly 1032 is located. That is, one light assembly 1032 is positioned within the tray 1030.

Figure 11A:
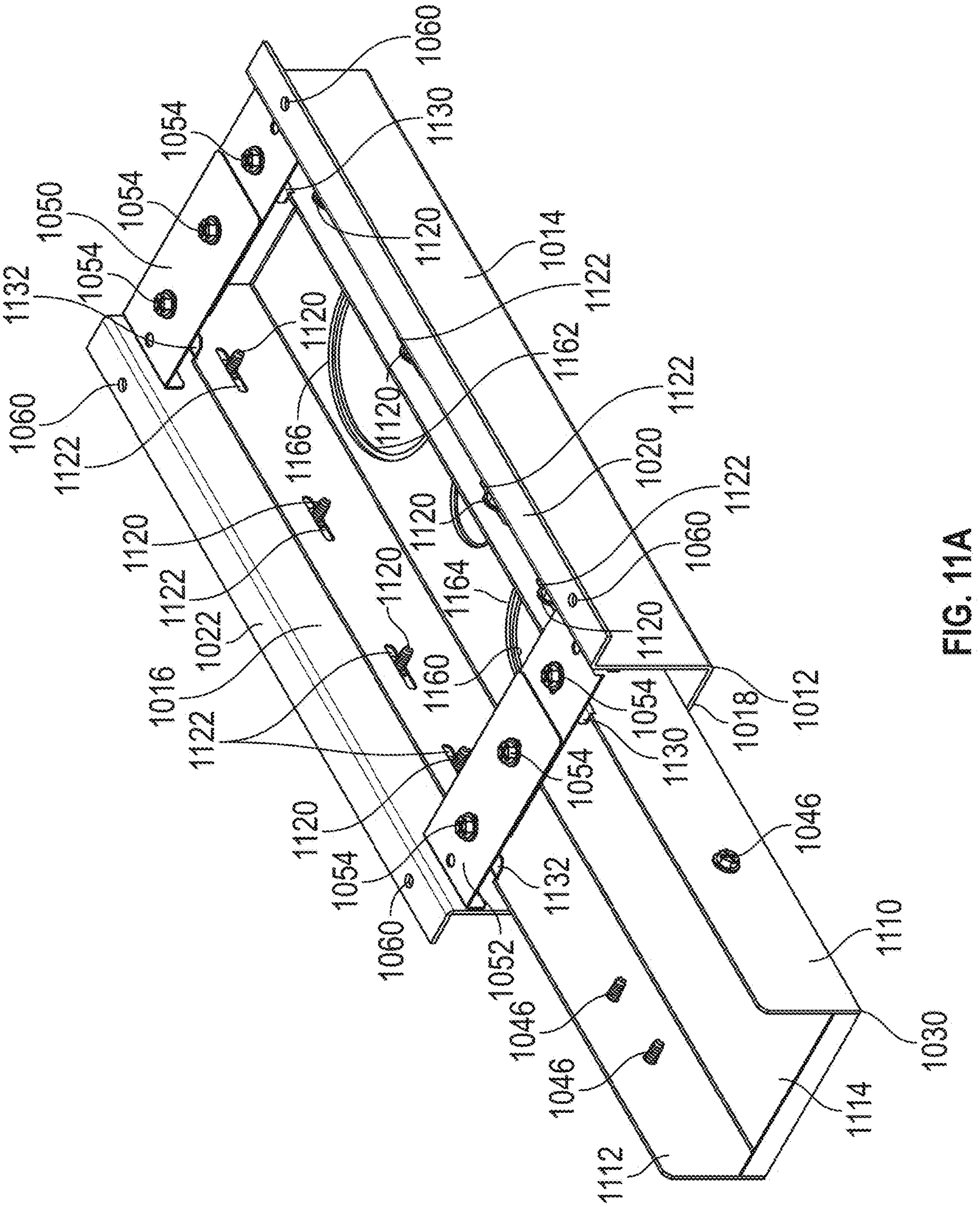
FIG. 11A is a ceiling component channel with a tray therein.
Figure 11B:
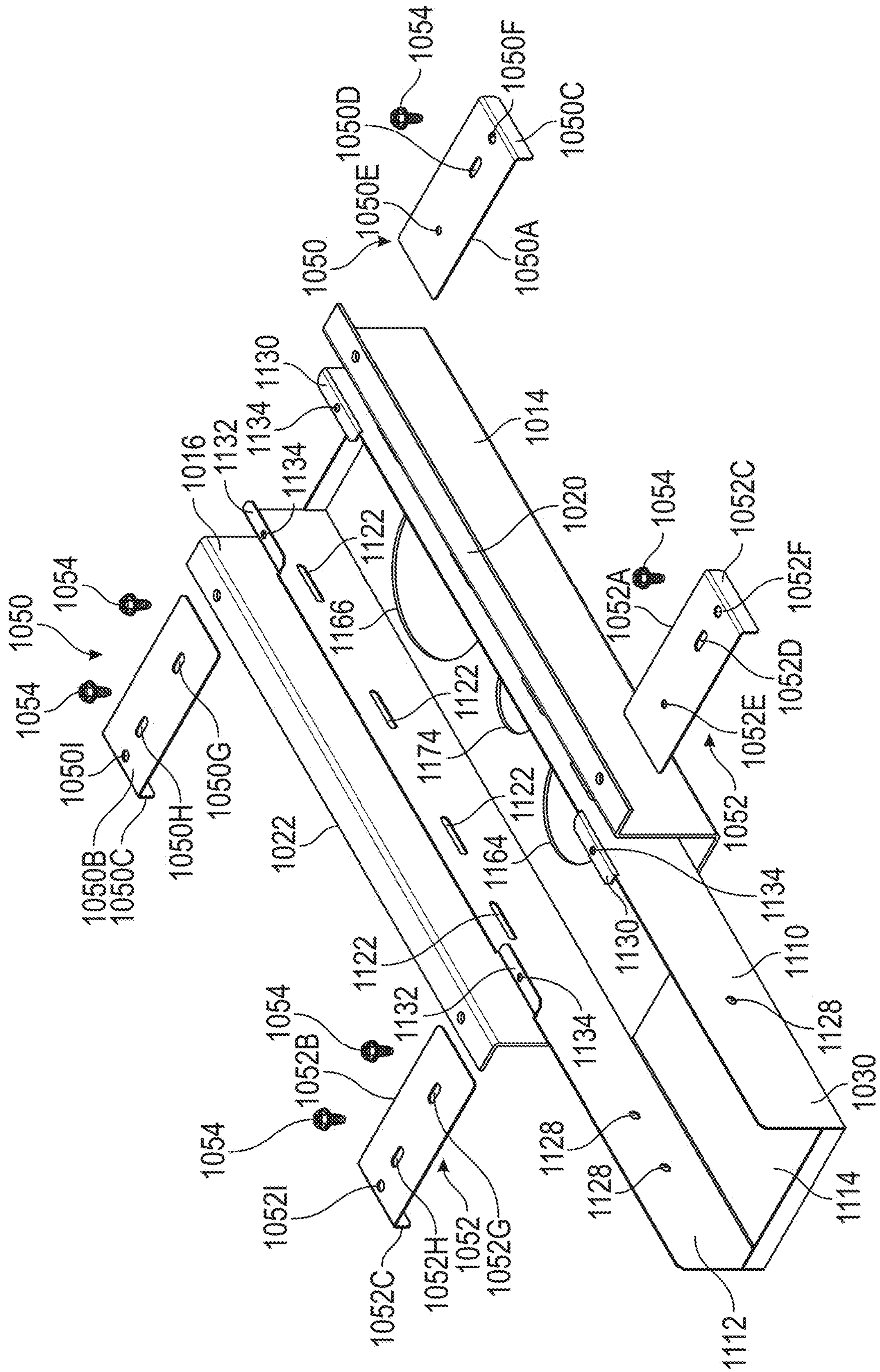
FIG. 11B is a partially exploded view of the assembly brackets of the tray.

Referring now also to FIGS. 11A-11G, the tray 1030 is illustrated in further detail. FIGS. 11A and 11B illustrate the tray 1030 received within the ceiling component channel 1012. The tray 1030, in FIG. 11A, has the fasteners 1046 that are used to hold the junction box 1042 without the junction box being present.

The clamps 1040 are configured in a similar manner to the clamps 52 illustrated in FIG. 2A in that the clamps extend from a first side wall 1110 to a second side wall 1112. The side walls 1110 and 1112, in this example, are perpendicular to a base 1114. The base 1114 may be touching or directly adjacent to the base 1018. However, a thin material such as two-sided tape may be disposed therebetween. The tray 1030 is therefore generally C-shaped. The fasteners 1046 extend through the longitudinal extending side walls 1110, 112 into the junction box 1042 of FIGS. 10A/10B. The side walls 1110 and 1112 have fasteners 1120 extending therethrough. In the present example, the fasteners 1120 are used for securing the clamps 1040 between the side walls 1110 and 1112. Because the system is made for adjustability, the fasteners 1120 may be received in slots 1122, which are longitudinally disposed. In this example, two slots 1122 are used on each side of the clamps 1040. That is, each clamp 1040 is secured by four fasteners 1120 that are received within four slots 1122. Should only one light fixture assembly be incorporated into the light fixture assembly, only one set of slots 1122 and fasteners 1120 may be used. During assembly to the ceiling component channel 102 the clamps 1040 may be longitudinally adjusted to be positioned to allow proper alignment.

Figure 11C:
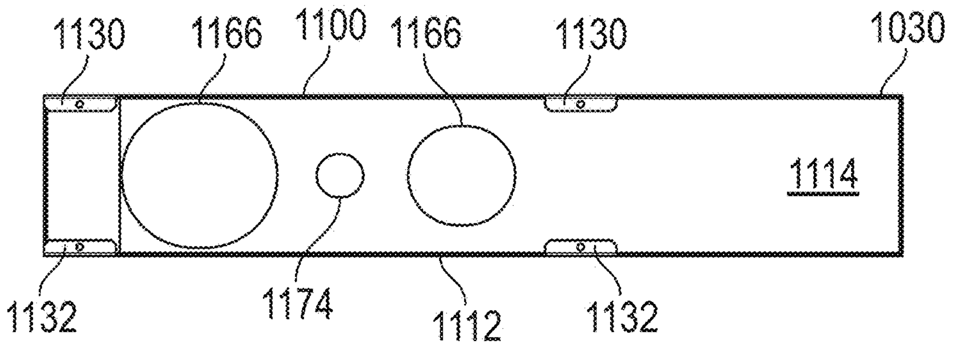
FIG. 11C is a top view of the elongated tray.
Figure 11D:
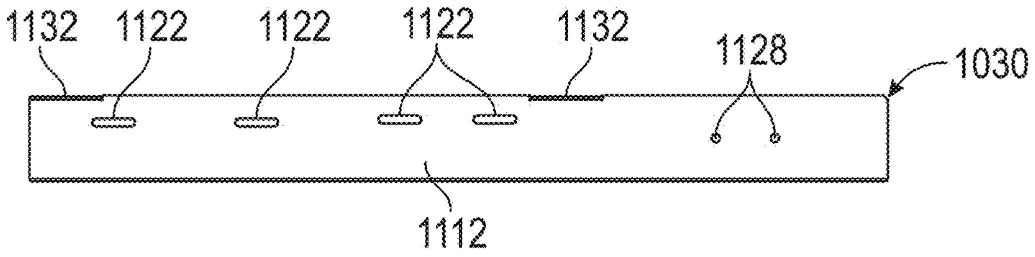
FIG. 11D is a typical side view of the elongated tray.
Figure 11E:
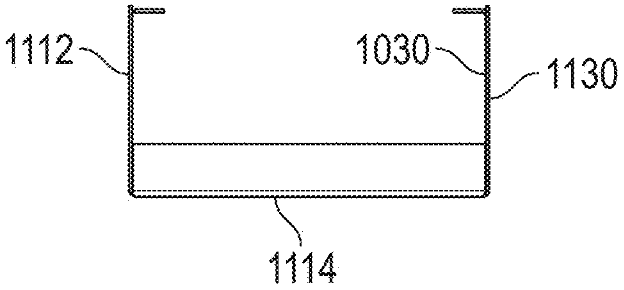
FIG. 11E is an end view of the elongated tray.
Figure 11F:
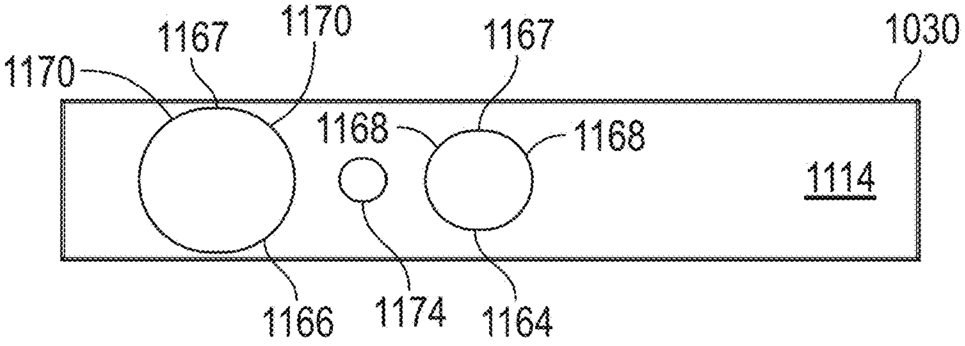
FIG. 11F is a bottom view (finished side) of the elongated tray.

In FIG. 11B, the adjustable brackets 1050 and 1052 are illustrated exploded from the assembly. The adjustable brackets 1050 and 1052 may be configured in a similar way. The separation of the brackets 1050 and 1052 allow details of the elongated tray 1030 to be revealed. Likewise, a top view of the tray 1030 is illustrated in FIG. 11C. A typical side view is illustrated in FIG. 11D. An end view of the tray 1030 is illustrated in FIG. 11E. A bottom view of the tray 1030 is illustrated in FIG. 11F. The fasteners 1046 used for securing the junction box 1042 are received within openings 1128. The walls 1110 and 1112 have couplers 1130, 1132 extending therefrom. In this example, two couplers 1130 and 1132 extend inwardly toward each other from the top edge of the respective walls 1110 and 1112. Each of the couplers 1130 and 1132 may be referred to as a flange. Each coupler 1130 is directly across from the corresponding coupler 1132. Each coupler 1130, 1132 has an opening 1134 that is used to receive one of the fasteners 1054.

The adjustable brackets 1050, 1052 may each have separately formed portions such as a first portion 1050A, 1052A and a second portion 1050B and 1052B, respectively. Providing two different portions for the adjustable brackets 1050, 1052 allow the adjustable brackets to adjust laterally relative to the tray 1030 so that a tab 1050C or 1052C may rest against the side walls 1014 or 1016, respectively. A friction fit may therefore be formed between the tabs 1050C and 1052C and the side walls 1014 and 1016, respectively. However, a type of fastener such as two side tape or a screw may be coupled to each of the tabs 1050C, 1052C to allow a more fixed or secure coupling to the side walls 1014, 1016. The first portion 1050A and 1052A have a slot 1050D and 1052D as well as a bracket opening 1050E and 1052E. Also, an opening 1050F, 1052F may be positioned within each first portion 1050A, 1052A. The second portions 1050B and 1052B have pairs of slots 1050G, 1050H, 1052G, and 1052H, respectively. Openings 1050I and 1052I may also be provided in the second portions 1050B, 1052B, respectively. The slots 1050G, 1050H and 1050D allow the fasteners 1054 to be loosened and to be adjustable relative to the couplers 1130, 1132. One of the fasteners 1054 extends through the slot 1050D and into the opening 1134 of the coupler 1130. One of the fasteners 1054 extends through the slot 1050H and into the opening 1134 of the coupler 1132. The same is true for the second bracket 1052. One of the fasteners 1054 extends through the opening 1050E and into the slot 1050G. The center fastener 1054 allows the two portions 1050A and 1050B to be fastened together.

In this example, the ceiling component channel 1012 has a first opening 1160 and a second opening 1162. The tray 1030 has a first opening 1164 in alignment with opening 1160 and a second opening 1166 in alignment with the second opening 1162. Of course, the number of sets of openings may vary depending on the desired function. The openings 1160 and 1162 be sized to accommodate the light assemblies 1032. The diameter and the space may be coordinated for the light assemblies 1032. In this example, the openings 1160 and 1162 of the ceiling component channel 1012 are round. The diameters for the openings 1160 and 1162 may be different. The openings 1164 and 1166 may be obround. That is, the obround shape of the openings 1164 and 1166 are elongated in the longitudinal direction of the tray 1030. This is best illustrated in FIGS. 11C and 11F. The obround shape is essentially a circle with a straight portion 1167 positioned therein. By having the straight portion 1167 between two half circles 1168 and 1170, an adjustability is made for alignment of the light assembly with the openings 1160 and 1162.

The tray 1030 may also have an opening 1174 for receiving the component 824 illustrated in FIG. 8A (such as sensor). The opening 1174 may also be obround and align with the opening 825 of FIG. 8A to allow the component 824 to pass therethrough.

In operation, the ceiling component channel 1012 may be assembled with the rest of the ceiling assembly such as that illustrated in FIG. 8A. At a later time, the tray 1030 with the light assembly 1032 may be assembled to the ceiling component channel 1012. The adjustable brackets 1050 and 1052 may have their widths adjusted by loosening the fasteners 1054 and allowing the fasteners 1054 to move relative to the slots 1050D-H, and 1052D-H. Ultimately, the tabs 1050C are placed against the walls 1014 and 1016 to allow the positioning of the tray in the lateral direction. In the longitudinal direction, the elongated or obround openings are aligned with the openings 1160, 1162 so that light assemblies 1032 are positioned where desired.

Figure 12A:
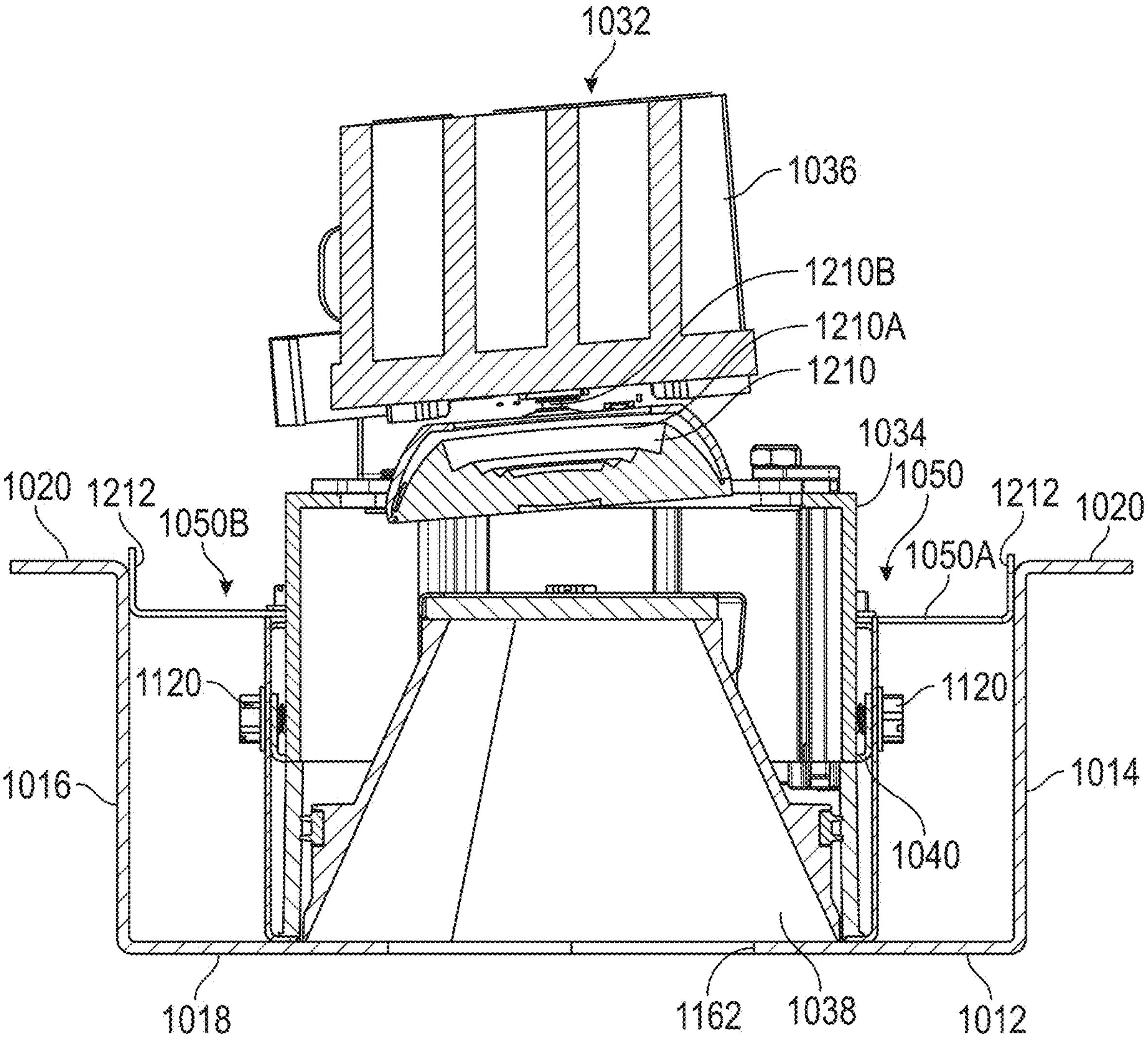
FIG. 12A is a cross-sectional view through the light assembly and through the ceiling component channel.
Figure 12B:
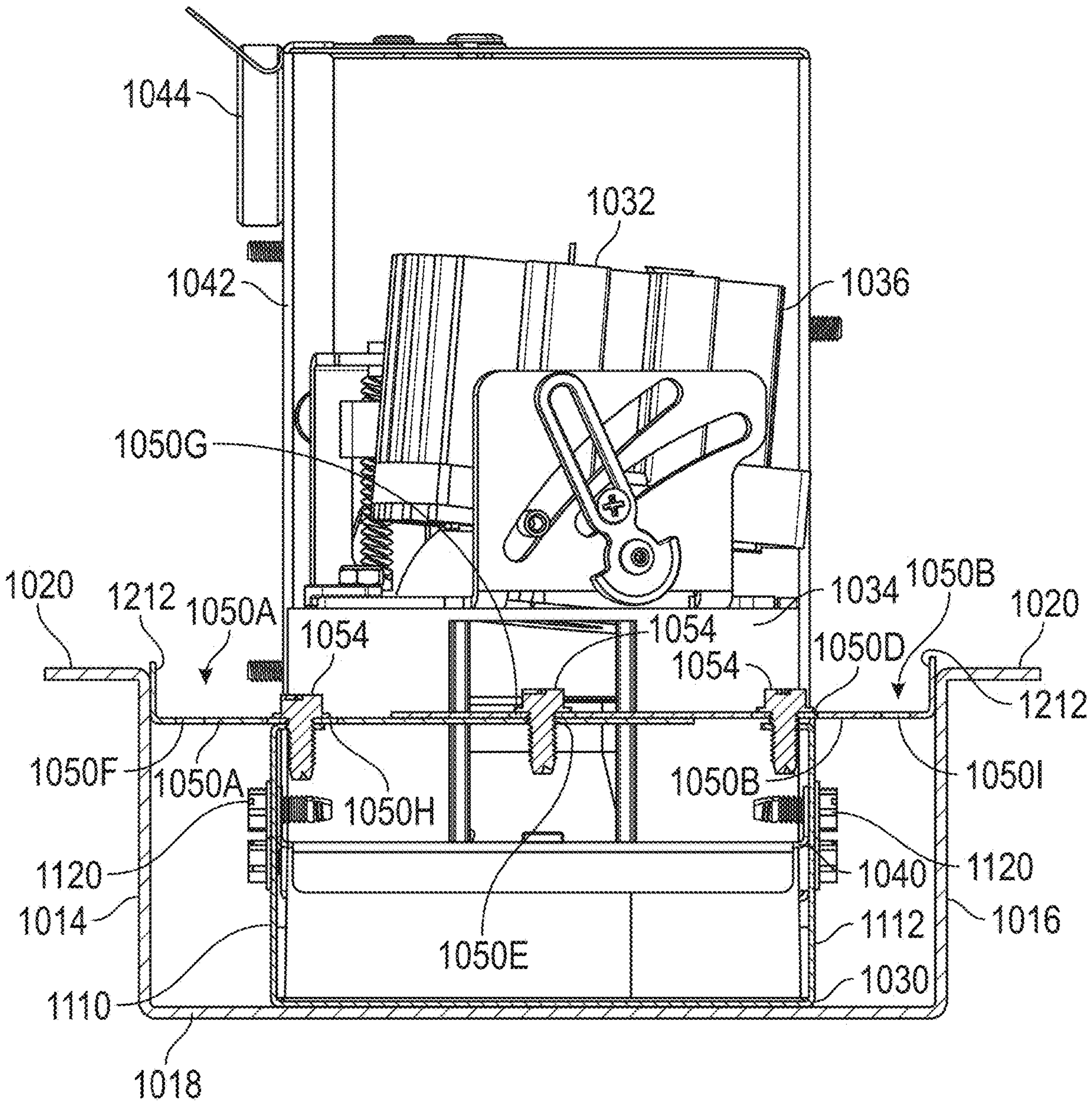
FIG. 12B is a cross-sectional view through the adjustable bracket assembly and through the ceiling component channel.

Referring now to FIGS. 12A and 12B, FIG. 12A is a cross-sectional view through the light assembly and through the ceiling component channel 1012 is illustrated. FIG. 12B is a cross-section through the brackets. In this example, the tabs 1212 are bent in an upward direction rather than in a downward direction as illustrated at 1050C of FIG. 11B. As shown in FIG. 12A, a light assembly 1210 that has optics 1210A and a light source 1210B are illustrated adjacent to the heat sink 1036 as described above. The baffle 1038 is also illustrated in greater detail. The opening 1162 is also illustrated. FIG. 12B shows the details of the bracket portions 1050A, 1050B and the interaction of the slots and fasteners 104 therein.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A light fixture assembly for assembly into a ceiling component channel comprising:

an elongated tray comprising a base comprising a first side, a second side and a first opening through the base, said elongated tray further comprises a first longitudinally extending wall extending from the second side of the base and a second longitudinally extending wall extending from the second side of the base, said first longitudinally extending wall having a first coupler, said second longitudinally extending wall having a second coupler extending inwardly toward the first longitudinally extending wall;

a first adjustable bracket comprising a first portion coupled to the first coupler and a second portion coupled to the second coupler, said first portion and the second portion coupling the elongated tray to the ceiling component channel;

a light assembly; and a coupling assembly coupling the light assembly to the elongated tray, said coupling assembly positioned around the first opening and adjacent to the second side of the base.

2. The light fixture assembly of claim 1 wherein the first opening is obround.

3. The light fixture assembly of claim 2 wherein the first opening aligns with a second opening in the ceiling component channel.

4. The light fixture assembly of claim 3 wherein the light assembly aligns with the first opening and the second opening.

5. The light fixture assembly of claim 1 wherein the first longitudinally extending wall comprises a first slot receiving a first fastener and the second longitudinally extending wall comprises a second slot receiving a second fastener.

6. The light fixture assembly of claim 5 wherein a clamp is coupled between the first longitudinally extending wall and the second longitudinally extending wall with the first fastener in the first slot and the second fastener in the second slot.

7. The light fixture assembly of claim 1 wherein the first portion is positionable relative to the second portion.

8. The light fixture assembly of claim 7 wherein the first portion is positionable relative to the first coupler, the second portion is positionable relative to the second portion and the first portion is positionable relative to the second portion.

9. The light fixture assembly of claim 8 wherein the first portion comprises a first slot and a second slot, said first slot aligned with the first coupler, wherein the second portion comprises a bracket opening and a third slot, wherein the second slot aligns with the bracket opening and the third slot aligns with the second coupler.

10. The light fixture assembly of claim 1 wherein the base comprises a component opening therethrough, the component opening has disposed therein or therethrough a wireless node, a smoke detector, fire detector, a gas sensor, a humidity sensor, an occupancy sensor, a light sensor and a temperature sensor.

11. The light fixture assembly of claim 1 further comprising a third coupler coupled to the first longitudinally extending wall and a fourth coupler coupled to the second longitudinally extending wall.

12. The light fixture assembly of claim 1 further comprising a second adjustable bracket coupled to a third coupler and a fourth coupler.

13. The light fixture assembly of claim 1 further comprising a second light assembly coupled to the tray at a third opening of the tray and coupled between the first longitudinally extending wall and the second longitudinally extending wall.

14. A ceiling system comprising:

the ceiling component channel comprising a bottom wall, a first side wall and a second side wall; and the light fixture assemblies of claim 1 coupled to the first side wall and the second side wall by the first adjustable bracket.

15. The ceiling system of claim 14 wherein the elongated tray is at least partially received within the ceiling component channel.

16. The ceiling system of claim 14 further comprising a first cross member of a ceiling grid and a second cross member of the ceiling grid parallel to the first cross member, wherein the first side wall comprises a first flange coupled to the first cross member and the second side wall comprise a second flange coupled to the second cross member.

17. The ceiling system of claim 14 wherein the ceiling component channel comprises a component opening therethrough, the component opening has disposed therein or therethrough a wireless node, a smoke detector, fire detector, a gas sensor, a humidity sensor, an occupancy sensor, a light sensor and a temperature sensor.

18. A light fixture assembly for assembly into a ceiling component channel comprising:

an elongated tray comprising a base comprising a first side, a second side and a first opening through the base, said elongated tray further comprises a first longitudinally extending wall extending from the second side of the base and a second longitudinally extending wall extending from the second side of the base, said first longitudinally extending wall having a first coupler and a third coupler, said second longitudinally extending wall having a second coupler and a fourth coupler extending inwardly toward the first longitudinally extending wall;

a first adjustable bracket comprising a first portion coupled to the first coupler and a second portion coupled to the third coupler, said first portion and the second portion coupling the elongated tray to the ceiling component channel;

a second adjustable bracket comprising a third portion coupled to the third coupler and a fourth portion coupled to the fourth coupler, said third portion and the fourth portion coupling the elongated tray to the ceiling component channel;

a light assembly; and a coupling assembly coupling the light assembly to the elongated tray, said coupling assembly positioned around the first opening and adjacent to the second side of the base.

19. The light fixture assembly of claim 18 wherein the first opening aligns with a second opening in the ceiling component channel.

20. The light fixture assembly of claim 18 wherein the first longitudinally extending wall comprises a first slot receiving a first fastener and the second longitudinally extending wall comprises a second slot receiving a second fastener, and wherein a clamp is coupled between the first longitudinally extending wall and the second longitudinally extending wall with the first fastener in the first slot and the second fastener in the second slot.

* * * * *